(12) United States Patent
Li et al.

(10) Patent No.: US 8,644,363 B2
(45) Date of Patent: Feb. 4, 2014

(54) APPARATUS AND METHOD FOR ESTIMATING CHANNEL IN MIMO SYSTEM BASED OFDM/OFDMA

(75) Inventors: Zheng Zi Li, Seongnam (KR);
Byung-Chul Kim, Yongin-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1150 days.

(21) Appl. No.: 12/521,777

(22) PCT Filed: Dec. 31, 2007

(86) PCT No.: PCT/KR2007/007044
§ 371 (c)(1),
(2), (4) Date: Jun. 29, 2009

(87) PCT Pub. No.: WO2008/082243
PCT Pub. Date: Jul. 10, 2008

(65) Prior Publication Data
US 2010/0085866 A1    Apr. 8, 2010

(30) Foreign Application Priority Data

Dec. 31, 2006 (KR) .................. 10-2006-0139253
May 11, 2007 (KR) .................. 10-2007-0046153
Sep. 3, 2007 (KR) .................. 10-2007-0088874

(51) Int. Cl.
*H04L 1/00* (2006.01)
(52) U.S. Cl.
USPC ........... 375/145; 375/149; 375/349; 375/364; 370/252; 370/509
(58) Field of Classification Search
USPC ......... 375/141, 145, 149, 260, 267, 340, 347, 375/349, 354, 364, 368; 370/203, 204, 208, 370/319, 324, 252, 344, 465, 478, 480, 500, 370/503, 509, 510
See application file for complete search history.

(56) References Cited

U.S. PATENT DOCUMENTS 7,965,785 B2 *  6/2011  Li et al. .................. 375/267
8,165,249 B2 *  4/2012  Li et al. .................. 375/344

(Continued)

FOREIGN PATENT DOCUMENTS

| KR | 1020060097493 A | 9/2006 |
| KR | 1020070021917 A | 2/2007 |
| KR | 1020070024740 A | 3/2007 |
| KR | 200425883 Y1 | 5/2007 |

(Continued)

OTHER PUBLICATIONS

International Search Report for application PCT/KR2007/007044 filed on Dec. 31, 2007.

(Continued)

*Primary Examiner* — Dac Ha
(74) *Attorney, Agent, or Firm* — Sughrue Mion, PLLC

(57) ABSTRACT

The present invention relates to an apparatus and method for estimating a channel in a MIMO wireless telecommunication system supporting the 0FDM/0FDMA. The present invention, in estimating a channel by using two or more pilots included in at least one received signal among received signals of a first channel and a second channel received through a first receiving antenna and received signals of a third channel and a fourth channel received through a second receiving antenna, determines a subchannel mapping rule respectively for the received signals of the first channel to the fourth channel, and estimates a channel with a different method according to the determined subchannel mapping rule. That is, the channel is estimated by using two or more pilots included in two or more tiles corresponding to the same subcarrier respectively, in case a subchannel rotation does not exist in the subchannel mapping rule, while the channel is estimated by using two pilots included in an individual tile, in case a subchannel rotation exists in the subchannel mapping rule.

53 Claims, 21 Drawing Sheets

(56) References Cited

U.S. PATENT DOCUMENTS

| | | | |
|---|---|---|---|
| 2004/0208254 A1* | 10/2004 | Lee et al. | 375/260 |
| 2006/0120477 A1* | 6/2006 | Shen et al. | 375/267 |
| 2007/0189151 A1* | 8/2007 | Pan et al. | 370/210 |
| 2009/0225891 A1* | 9/2009 | Ma et al. | 375/267 |
| 2010/0027698 A1* | 2/2010 | Kim et al. | 375/260 |
| 2011/0105046 A1* | 5/2011 | Molnar et al. | 455/67.11 |

FOREIGN PATENT DOCUMENTS

| | | |
|---|---|---|
| KR | 1020080063441 A | 7/2008 |
| WO | WO 2006/020036 A1 | 2/2006 |

OTHER PUBLICATIONS

Written Opinion of the International Searching Authority for application PCT/KR2007/007044 filed on Dec. 31, 2007.

* cited by examiner

Fig. 3
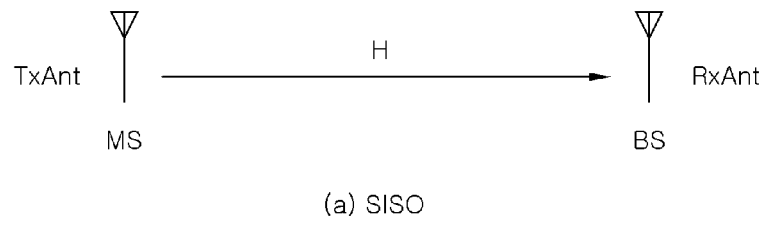
(a) SISO
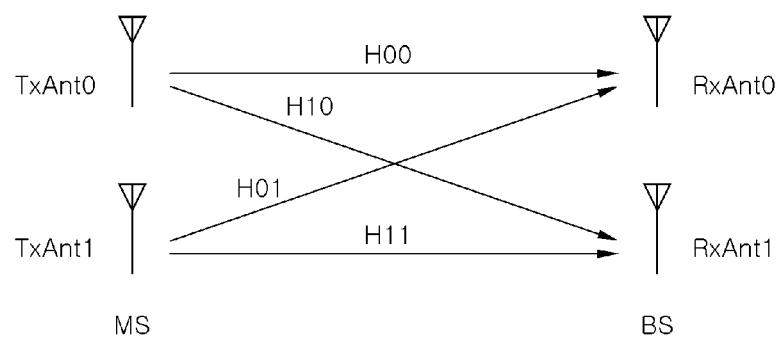
(b) MIMO
Fig. 4
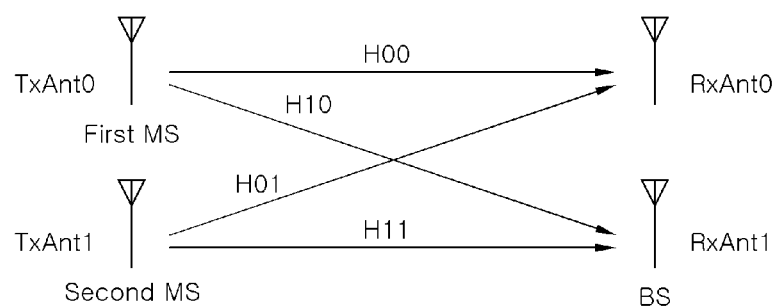

(a) No subchannel rotation (b) Subchannel rotation

Fig. 10
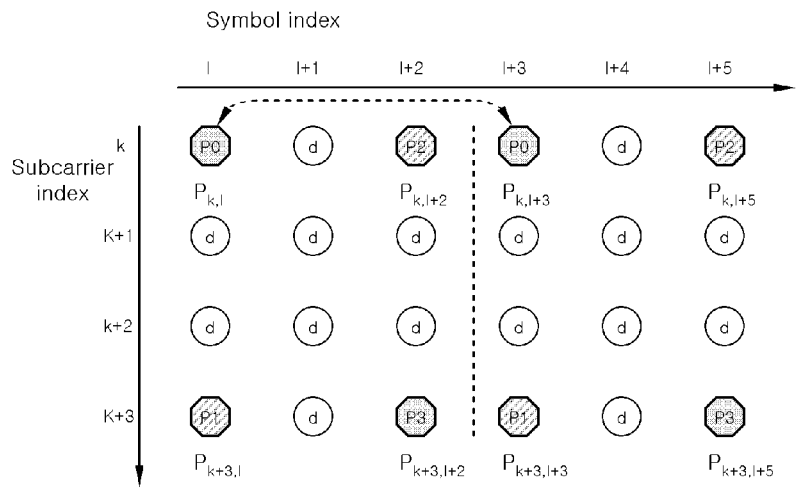
(a)
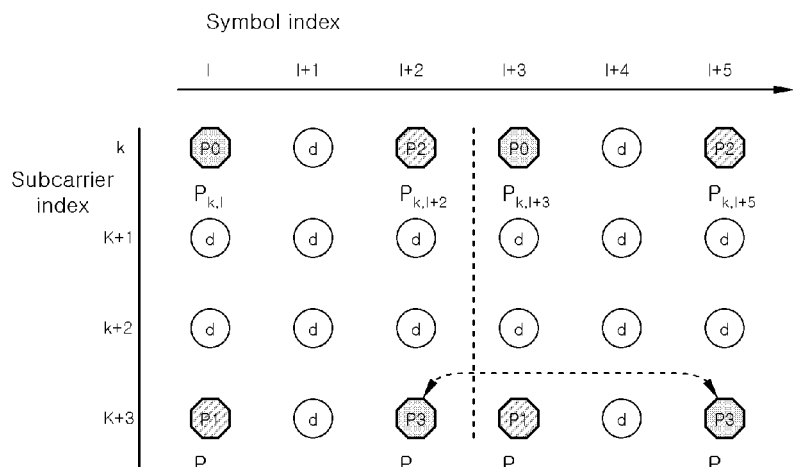
(b)
○ Pilot subcarrier
○ Data subcarrier

○ Pilot subcarrier
○ Data subcarrier

Fig. 13
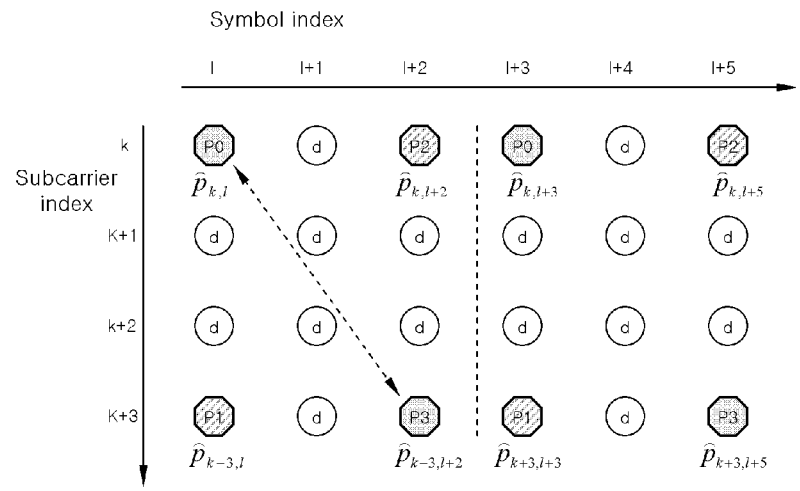
(a)
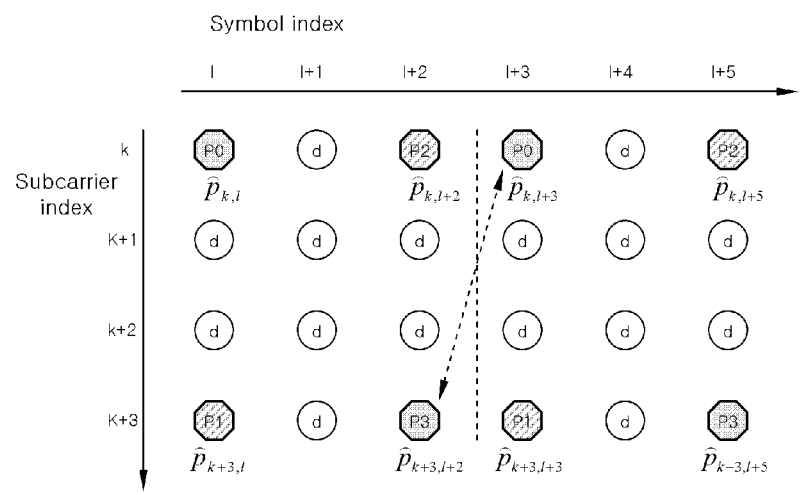
(b)
◯ Pilot subcarrier
◯ Data subcarrier

Fig. 15

$$\begin{bmatrix} p_{k,l} & h_{k,l+1} & 0 & p_{k,l+3} & h_{k,l+4} & 0 \\ h_{k+1,l} & h_{k-1,l-1} & h_{k+1,l+2} & h_{k+1,l+3} & h_{k-1,l-4} & h_{k+1,l+5} \\ h_{k+2,l} & h_{k+2,l+1} & h_{k+2,l+2} & h_{k+2,l+3} & h_{k+2,l+4} & h_{k+2,l+5} \\ 0 & h_{k+3,l+1} & p_{k+3,l+2} & 0 & h_{k+3,l+4} & p_{k+3,l+5} \end{bmatrix}$$

⇩

$$\begin{bmatrix} p_{k,l} & \frac{2}{3}p_{k,l}+\frac{1}{3}p_{k,l+3} & \frac{1}{3}p_{k,l}+\frac{2}{3}p_{k,l+3} & p_{k,l+3} & h_{k,l+4} & 0 \\ h_{k+1,l} & h_{k+1,l+1} & h_{k+1,l+2} & h_{k-1,l+3} & h_{k+1,l+4} & h_{k+1,l+5} \\ h_{k+2,l} & h_{k+2,l+1} & h_{k+2,l+2} & h_{k+2,l+3} & h_{k+2,l+4} & h_{k+2,l+5} \\ 0 & h_{k+3,l+1} & p_{k+3,l+2} & \frac{2}{3}p_{k+3,l+2}+\frac{1}{3}p_{k+3,l+5} & \frac{1}{3}p_{k+3,l+2}+\frac{2}{3}p_{k+3,l+5} & p_{k+3,l+5} \end{bmatrix}$$

⇩

$$\begin{bmatrix} p_{k,l} & \frac{2}{3}p_{k,l}+\frac{1}{3}p_{k,l+3} & \frac{1}{3}p_{k,l}+\frac{2}{3}p_{k,l+3} & p_{k,l+3} & p_{k,l+3} & p_{k,l+3} \\ h_{k+1,l} & h_{k+1,l+1} & h_{k+1,l+2} & h_{k+1,l+3} & h_{k+1,l+4} & h_{k+1,l+5} \\ h_{k+2,l} & h_{k+2,l+1} & h_{k-2,l+2} & h_{k-2,l+3} & h_{k-2,l+4} & h_{k-2,l+5} \\ p_{k+3,l+2} & p_{k+3,l+2} & p_{k+3,l+2} & \frac{2}{3}p_{k+3,l+2}+\frac{1}{3}p_{k+3,l+5} & \frac{1}{3}p_{k+3,l+2}+\frac{2}{3}p_{k+3,l+5} & p_{k+3,l+5} \end{bmatrix}$$

⇩

$$h_{k+1,l} = \frac{1}{3}p_{k+3,l+2} + \frac{2}{3}p_{k,l}$$

$$h_{k+2,l} = \frac{2}{3}p_{k+3,l+2} + \frac{1}{3}p_{k,l}$$

$$h_{k+1,l+1} = \frac{1}{3}p_{k+3,l+2} + \frac{2}{3}(\frac{2}{3}p_{k,l} + \frac{1}{3}p_{k,l+3}) = \frac{1}{3}p_{k+3,l+2} + \frac{4}{9}p_{k,l} + \frac{2}{9}p_{k,l+3}$$

$$h_{k+2,l+1} = \frac{2}{3}p_{k+3,l+2} + \frac{1}{3}(\frac{2}{3}p_{k,l} + \frac{1}{3}p_{k,l+3}) = \frac{2}{3}p_{k+3,l+2} + \frac{2}{9}p_{k,l} + \frac{4}{9}p_{k,l+3}$$

$$\begin{array}{cccccc} p_{k,l} & h_{k,l+1} & O & p_{k,l+3} & h_{k,l-4} & O \\ h_{k-1,l} & h_{k+1,l+1} & h_{k-1,l-2} & h_{k-1,l+3} & h_{k+1,l+4} & h_{k+1,l+5} \\ h_{k+2,l} & h_{k+2,l-1} & h_{k+2,l+2} & h_{k+2,l+3} & h_{k-2,l+4} & h_{k+2,l-5} \\ O & h_{k-3,l+1} & p_{k+3,l+2} & O & h_{k+3,l-4} & p_{k+3,l+5} \end{array}$$

⇓

$$\begin{array}{cccccc} p_{k,l} & \frac{2}{3}p_{k,l}+\frac{1}{3}p_{k,l+3} & \frac{1}{3}p_{k,l}+\frac{2}{3}p_{k,l+3} & p_{k,l+3} & h_{k,l+4} & O \\ h_{k-1,l} & h_{k-1,l+1} & h_{k+1,l+2} & h_{k+1,l-3} & h_{k+1,l+4} & h_{k+1,l+5} \\ h_{k+2,l} & h_{k+2,l-1} & h_{k+2,l+2} & h_{k+2,l+3} & h_{k+2,l+4} & h_{k+2,l+5} \\ O & h_{k+3,l+1} & p_{k+3,l+2} & \frac{2}{3}p_{k+3,l+2}+\frac{1}{3}p_{k+3,l+5} & \frac{1}{3}p_{k+3,l+2}+\frac{2}{3}p_{k+3,l-5} & p_{k+3,l+5} \end{array}$$

⇓

$$h_{k+1,l} = \frac{1}{5}p_{k+3,l+2} + \frac{4}{5}p_{k,l}$$

$$h_{k+2,l} = \frac{2}{5}p_{k+3,l-2} + \frac{3}{5}p_{k,l}$$

$$h_{k+1,l+1} = \frac{1}{4}p_{k+3,l+2} + \frac{3}{4}(\frac{2}{3}p_{k,l} + \frac{1}{3}p_{k,l+3}) = \frac{1}{4}p_{k+3,l+2} + \frac{1}{2}p_{k,l} + \frac{1}{4}p_{k,l+3}$$

$$h_{k+2,l+1} = \frac{1}{2}(\frac{2}{3}p_{k,l} + \frac{1}{3}p_{k,l+3} + p_{k+3,l+2}) = \frac{1}{3}p_{k,l} + \frac{1}{6}p_{k,l+3} + \frac{1}{2}p_{k+3,l+2}$$

$$h_{k+3,l+1} = \frac{1}{4}(\frac{2}{3}p_{k,l} + \frac{1}{3}p_{k,l+3}) + \frac{3}{4}p_{k+3,l+2} = \frac{1}{6}p_{k,l} + \frac{1}{12}p_{k,l+3} + \frac{3}{4}p_{k+3,l+2}$$

$$\begin{bmatrix} p_{k,l} & h_{k,l+1} & 0 & p_{k,l+3} & h_{k,l+4} & 0 \\ h_{k+1,l} & h_{k+1,l+1} & h_{k+1,l+2} & h_{k+1,l+3} & h_{k+1,l+4} & h_{k+1,l+5} \\ h_{k-2,l} & h_{k+2,l-1} & h_{k+2,l-2} & h_{k-2,l+3} & h_{k+2,l+4} & h_{k+2,l+5} \\ 0 & h_{k-3,l+1} & p_{k+3,l+2} & 0 & h_{k-3,l-4} & p_{k+3,l+5} \end{bmatrix}$$

⇓

$$\begin{bmatrix} p_{k,l} & \tfrac{2}{3}p_{k,l}+\tfrac{1}{3}p_{k,l+3} & \tfrac{1}{3}p_{k,l}+\tfrac{2}{3}p_{k,l-3} & p_{k,l+3} & h_{k,l+4} & 0 \\ h_{k+1,l} & h_{k+1,l+1} & h_{k+1,l+2} & h_{k-1,l+3} & h_{k-1,l+4} & h_{k+1,l-5} \\ h_{k+2,l} & h_{k-2,l+1} & h_{k+2,l+2} & h_{k+2,l+3} & h_{k+2,l+4} & h_{k+2,l+5} \\ 0 & h_{k+3,l+1} & p_{k+3,l-2} & \tfrac{2}{3}p_{k+3,l+2}+\tfrac{1}{3}p_{k+3,l+5} & \tfrac{1}{3}p_{k+3,l+2}+\tfrac{2}{3}p_{k+3,l+5} & p_{k+3,l+5} \end{bmatrix}$$

⇓

$$h_{k+1,l} = \frac{\sqrt{8}}{1+\sqrt{8}}p_{k,l} + \frac{1}{1+\sqrt{8}}p_{k+3,l+2} = 0.7388p_{k,l} + 0.2612p_{k+3,l+2}$$

$$h_{k-2,l} = \frac{\sqrt{5}}{2+\sqrt{5}}p_{k,l} + \frac{2}{2+\sqrt{5}}p_{k+3,l+2} = 0.5279p_{k,l} + 0.4721p_{k+3,l+2}$$

$$h_{k+1,l+1} = \frac{\sqrt{5}}{\sqrt{2}+\sqrt{5}}p_{k,l} + \frac{\sqrt{2}}{\sqrt{2}+\sqrt{5}}p_{k+3,l+2} = 0.6126p_{k,l} + 0.3874p_{k+3,l+2}$$

⋮

$$h_{k+1,l} = \frac{2}{3}(\frac{2}{3}a + \frac{1}{3}p2) + \frac{1}{3}p1 = \frac{5}{9}p1 + \frac{4}{9}p2$$

$$h_{k+2,l} = \frac{2}{3}p1 + \frac{1}{3}(\frac{2}{3}a + \frac{1}{3}p1) = \frac{8}{9}p1 + \frac{1}{9}p2$$

$$h_{k,l+1} = \frac{1}{2}(\frac{2}{3}a + \frac{1}{3}p2 + P2) = \frac{5}{6}p2 + \frac{1}{6}p1$$

$$h_{k-2,l+1} = \frac{2}{3}a + \frac{1}{3}p1 = \frac{2}{3}p1 + \frac{1}{3}p2$$

$$\vdots \qquad \text{Where} \quad a = \frac{1}{2}(p1 + p2)$$

(a) Slot (b) Tile

APPARATUS AND METHOD FOR ESTIMATING CHANNEL IN MIMO SYSTEM BASED OFDM/OFDMA

TECHNICAL FIELD

The present invention relates to an apparatus and method for estimating a channel in a MIMO (Multiple Input Multiple Output) wireless telecommunication system supporting the OFDM/OFDMA, more particularly, to an apparatus and method for estimating a channel with a different mode according to the subchannel mapping rule for the uplink PUSC (Partial Usage of Subchannels) mode in a MIMO wireless telecommunication system which supports the OFDM/OFDMA while employing a standard such as the IEEE 802.16d/e, Wibro, WiMAX.

BACKGROUND ART

In the WiBro (Wireless Broadband Internet) which is a korean wireless portable internet standard, the OFDM (Orthogonal Frequency Division Multiplexing) is used as a signal transmission scheme so as to provide the high speed data service in the radio environment when a user moves. In addition, the OFDMA (Orthogonal Frequency Division Multiple Access) which is based on the OFDM is used as a multiple access scheme so that multi users might simultaneously receive an internet service. The TDD (Time Division Duplexing) which classifies the downlink and the uplink according to a time is used as a duplexing scheme.

In such a wireless telecommunication system supporting the OFDM and/or OFDMA, in order to perform a smooth communications between a base station and a terminal, the characteristic of a channel which is mutually formed should be known. For this, firstly, the synchronization has to be mutually made. Further, the operation of an oscillator has to be exact.

However, in case of the receiving side, the time offset and the carrier frequency offset can be generated due to various factors such as a multi path characteristic between the receiving side and the transmission side, and the time-varying characteristic which is generated as the terminal or the electric wave obstacle moves. Therefore, the receiving side should continuously estimate and compensate the time offset and the carrier frequency offset. Ultimately, the receiving side should estimate and compensate the channel which is mutually formed based on this.

In the meantime, in a MIMO (Multiple Input Multiple Output) system which performs the multiple input and multiple output transmission by using a plurality of transmitting antennas and a plurality of receiving antennas, a plurality of channels exist between the transmission side and the receiving side. As to the plurality of channels, even in case of the channel which is formed between the fixed transmission side and the fixed receiving side, the subcarrier which is used in channel can be changed with time (specifically, OFDMA symbol) according to the subchannel mapping rule.

Therefore, in case of the uplink PUSC mode of the MIMO system, it is necessary for the base station (receiving side) to flexibly estimate and compensate a channel according to the situation after receiving the signal transmitted with a different pilot pattern from each terminal (transmission side).

DISCLOSURE OF INVENTION

Technical Problem

The invention has been designed to solve the above-mentioned problems, and it is an object of the invention to provide an apparatus and method for estimating and compensating the carrier frequency offset and/or the time offset for the uplink PUSC mode, and estimating the channel based on it in a MIMO wireless telecommunication system which supporting the OFDM/OFDMA.

It is another object of the present invention to provide an apparatus and method for estimating a channel with a different mode according to the subchannel mapping rule for the uplink PUSC mode in a MIMO wireless telecommunication system supporting the OFDM/OFDMA.

It is still another object of the present invention to provide an apparatus and method for efficiently estimating a channel even in case of a collaborative MIMO in which a plurality of terminals transmits each signal with a different pilot pattern, for the uplink PUSC mode in a MIMO wireless telecommunication system supporting the OFDM/OFDMA.

Technical Solution

According to an aspect of the present invention, provided is an apparatus for estimating a channel in a MIMO wireless telecommunication system supporting an OFDM or OFDMA, which comprises FFT means for transforming signals of a first channel and a second channel received through a first receiving antenna and signals of a third channel and a fourth channel received through a second receiving antenna, from a time domain to a frequency domain; carrier frequency offset processing means for estimating a carrier frequency offset for a corresponding received signal by using two or more pilots included in at least one received signal among received signals of the first channel to the fourth channel, which are transformed into the frequency domain; time offset processing means for estimating a time offset for a corresponding received signal by using two or more pilots included in at least one received signal among received signals of the first channel to the fourth channel, which are transmitted from the carrier frequency offset processing means or the FFT means; and channel estimating means for estimating a channel of each received signal of the first channel to the fourth channel with a different method according to a subchannel mapping rule by using pilots included in each received signal, which is transmitted from the time offset processing means.

According to an aspect of the present invention, provided is an apparatus for estimating a channel in a MIMO wireless telecommunication system supporting an OFDM or OFDMA, which comprises FFT means for transforming signals of a first channel and a second channel received through a first receiving antenna and signals of a third channel and a fourth channel received through a second receiving antenna, from a time domain to a frequency domain; subchannel mapping rule determining means for determining a subchannel mapping rule for the received signal of the first channel to the fourth channel; time offset processing means for estimating a time offset for a corresponding received signal by using a plurality of tiles or slots adjacent in the direction of the OFDMA symbol axis, for a received signal having no subchannel rotation in the subchannel mapping rule among the received signals of the first channel to the fourth channel, which are transformed into the frequency domain; and channel estimating means for estimating a channel of each received signal by using pilots included in the corresponding received signal, for the received signals of the first channel to the fourth channel transmitted from the time offset processing means.

According to an aspect of the present invention, provided is an apparatus for estimating a channel in a MIMO wireless telecommunication system supporting an OFDM or OFDMA, which comprises FFT means transforming signals of a first channel and a second channel received through a first receiving antenna and signals of a third channel and a fourth channel received through a second receiving antenna, from a time domain to a frequency domain; subchannel mapping rule determining means for determining a subchannel mapping rule respectively for the received signals of the first channel to the fourth channel; time offset processing means for estimating a time offset for a corresponding received signal, by using two or more pilots included in at least one received signal among the received signal of the first channel to the fourth channel, which are transformed into the frequency domain; and channel estimating means estimating a channel of each of the received signal by using a channel compensation value of a corresponding tile which is obtained by calculating the channel estimation value of each tile adjacent in the direction of the OFDMA symbol axis and reflecting a calculated channel estimation value of an adjacent tile into a channel estimation value of the corresponding tile, for a signal having no subchannel rotation in the subchannel mapping rule among the received signals of the first channel to the fourth channel transmitted from the time offset processing means.

According to an aspect of the present invention, provided is an apparatus for estimating a channel in a MIMO wireless telecommunication system supporting an OFDM or OFDMA, which comprises FFT means for transforming signals of a first channel and a second channel received through a first receiving antenna and signals of a third channel and a fourth channel received through a second receiving antenna, from a time domain to a frequency domain; subchannel mapping rule determining means for determining a subchannel mapping rule respectively for the received signals of the first channel to the fourth channel; and time offset processing means for estimating a time offset for a corresponding received signal by using a plurality of tiles or slots adjacent in the direction of the OFDMA symbol axis, for a received signal having no subchannel rotation in the subchannel mapping rule among the received signals of the first channel to the fourth channel, which are transformed into the frequency domain.

According to another aspect of the present invention, provided is a method for estimating a channel in a MIMO wireless telecommunication system supporting an OFDM or OFDMA, which comprises the steps of: a) receiving signals of a first channel and a second channel through a first receiving antenna, and signals of a third channel and a fourth channel through a second receiving antenna; b) determining a subchannel mapping rule for the received signal of the first channel to the fourth channel; and c) estimating the first channel to the fourth channel respectively with a different mode according to the determined subchannel mapping rule.

According to another aspect of the present invention, provided is a method for estimating a channel in a MIMO wireless telecommunication system supporting an OFDM or OFDMA, which comprises the steps of: a) receiving signals transmitted with a spatial multiplexing through the same subcarrier with a different pilot pattern from a first terminal and a second terminal equipped with one transmitting antenna respectively, through a first receiving antenna and a second receiving antenna; b) estimating and compensating a time offset for a corresponding received signal by using a plurality of slots adjacent in the direction of the OFDMA symbol axis, for a signal having no subchannel rotation in a subchannel mapping rule among the received signals; and c) estimating a channel by using pilots included in each received signal, for the received signal in which the time offset is compensated.

According to another aspect of the present invention, provided is a method for estimating a channel in a MIMO wireless telecommunication system supporting an OFDM or OFDMA, which comprises the steps of: a) receiving signals transmitted with a spatial multiplexing through the same subcarrier with a different pilot pattern from a first terminal and a second terminal equipped with one transmitting antenna respectively, through a first receiving antenna and a second receiving antenna; b) estimating and compensating a time offset for a corresponding received signal, by using two or more pilots included in at least one received signal among the received signals; and c) estimating a channel of the received signal by using the channel compensation value of a corresponding tile, which is produced by calculating the channel estimation value of each tile adjacent in the direction of the OFDMA symbol axis and reflecting the calculated channel estimation value of an adjacent tile into the channel estimation value of the corresponding tile, for a signal having no subchannel rotation in a subchannel mapping rule among the signals in which the time offset is compensated.

According to another aspect of the present invention, provided is a method for estimating a channel in a MIMO wireless telecommunication system supporting an OFDM or OFDMA, which comprises the steps of: a) receiving signals transmitted with a spatial multiplexing through the same subcarrier with a different pilot pattern from a first terminal and a second terminal equipped with one transmitting antenna respectively, through a first receiving antenna and a second receiving antenna; and b) estimating a the time offset for a corresponding received signal by using a plurality of slots which is adjacent in the direction of OFDMA symbol axis, for a signal having no subchannel rotation in a subchannel mapping rule among the received signals.

Advantageous Effects

According to the present invention, in a MIMO wireless telecommunication system supporting the OFDM/OFDMA, it has an effect that the performance of receiving of the terminal is improved by estimating channel of the uplink PUSC mode by efficiently using a different pilot pattern.

Further, according to the present invention, in a MIMO wireless telecommunication system supporting the OFDM/OFDMA, by estimating channel with a different mode for the uplink PUSC mode according to the subchannel allocation scheme, it has an effect that the base station can fluently estimate the channel according to the situation.

Further, according to the present invention, in a MIMO wireless telecommunication system supporting the OFDM/OFDMA, it has an effect that the channel can be efficiently estimated for the uplink PUSC mode even in case of the collaborative MIMO in which a plurality of terminals transmits each signal by using a different pilot pattern.

BRIEF DESCRIPTION OF THE DRAWINGS

FIG. 3 is a schematic diagram illustrating a SISO system and a MIMO system.

FIG. 4 is a drawing illustrating a signal transmission method between two terminals and one base station in a 2×2 collaborative MIMO system.

FIG. 10 is a drawing illustrating the estimation method of a first carrier frequency offset according to the present invention in case of no subchannel rotation.

FIG. 13 is a drawing illustrating the estimation method of a time offset according to the present invention in case of no subchannel rotation.

FIGS. 15 to 17 are drawings illustrating the estimation method of channel according to the present invention in case of no subchannel rotation.

MODE FOR THE INVENTION

Hereinafter, an exemplary embodiment of the present invention will be described in detail with reference to the accompanying drawings. Well known functions and constructions are not described in detail since they would obscure the invention in unnecessary detail.

Figure 1:
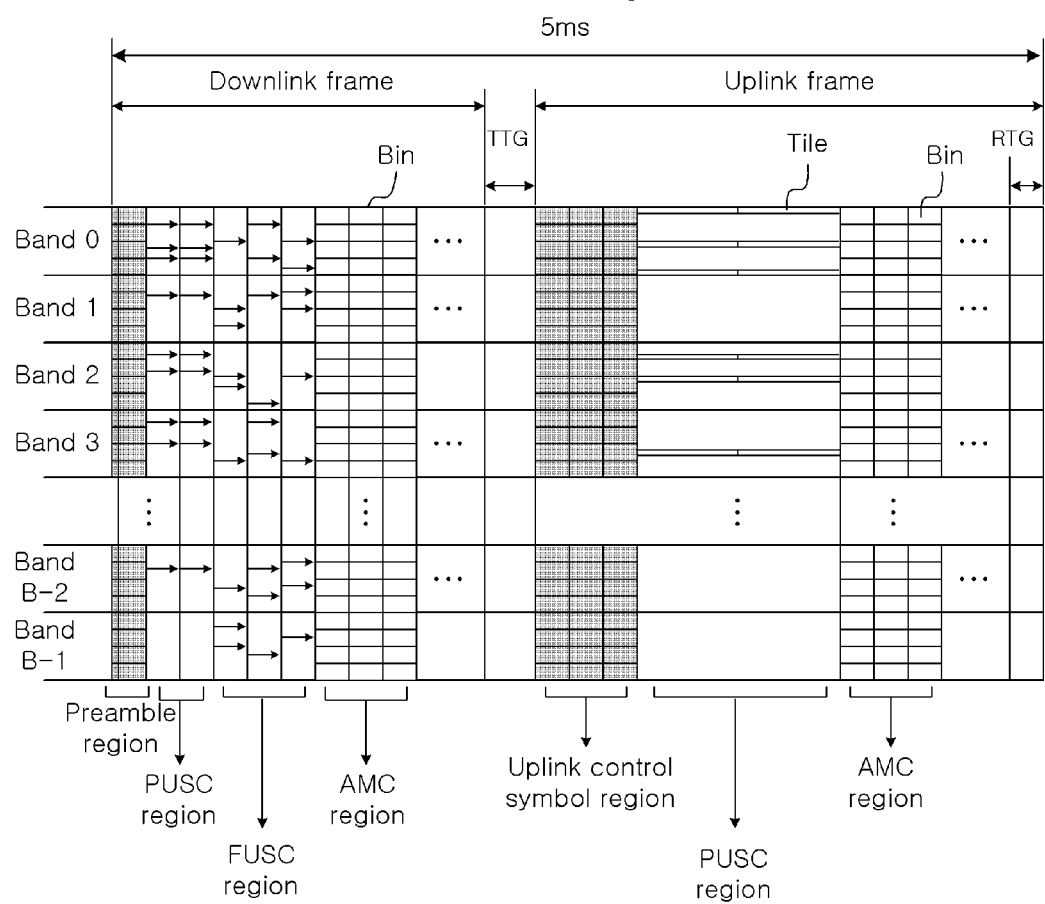
FIG. 1 is a drawing showing an example of a frame structure which is used in a portable Internet system supporting the IEEE 802.16d/e.

FIG. 1 is a drawing showing an example of a frame structure which is used in a portable Internet system supporting the IEEE 802.16d/e.

In the portable Internet system employing a TDD, one frame is time-divided to be used for transmission and receiving.

Referring to FIG. 1, one frame is divided into a downlink frame where data is transmitted from a base station to a terminal and an uplink frame where data is transmitted from the terminal to the base station. A TTG (Transmit/receive Transition Gap) and a RTG (Receive/transmit Transition Gap) are inserted respectively between the downlink frame and the uplink frame. In the illustrated example, the downlink frame includes at least one of a preamble region, a PUSC (Partial Usage of Subchannels) region, a FUSC (Full Usage of Subchannels) region, and an AMC (Adaptive Modulation & Coding) region, while the uplink frame includes at least one of an uplink control symbol region, a PUSC region, and an AMC region.

The present invention is related with the uplink PUSC region of the frame structure described above.

Figure 2:
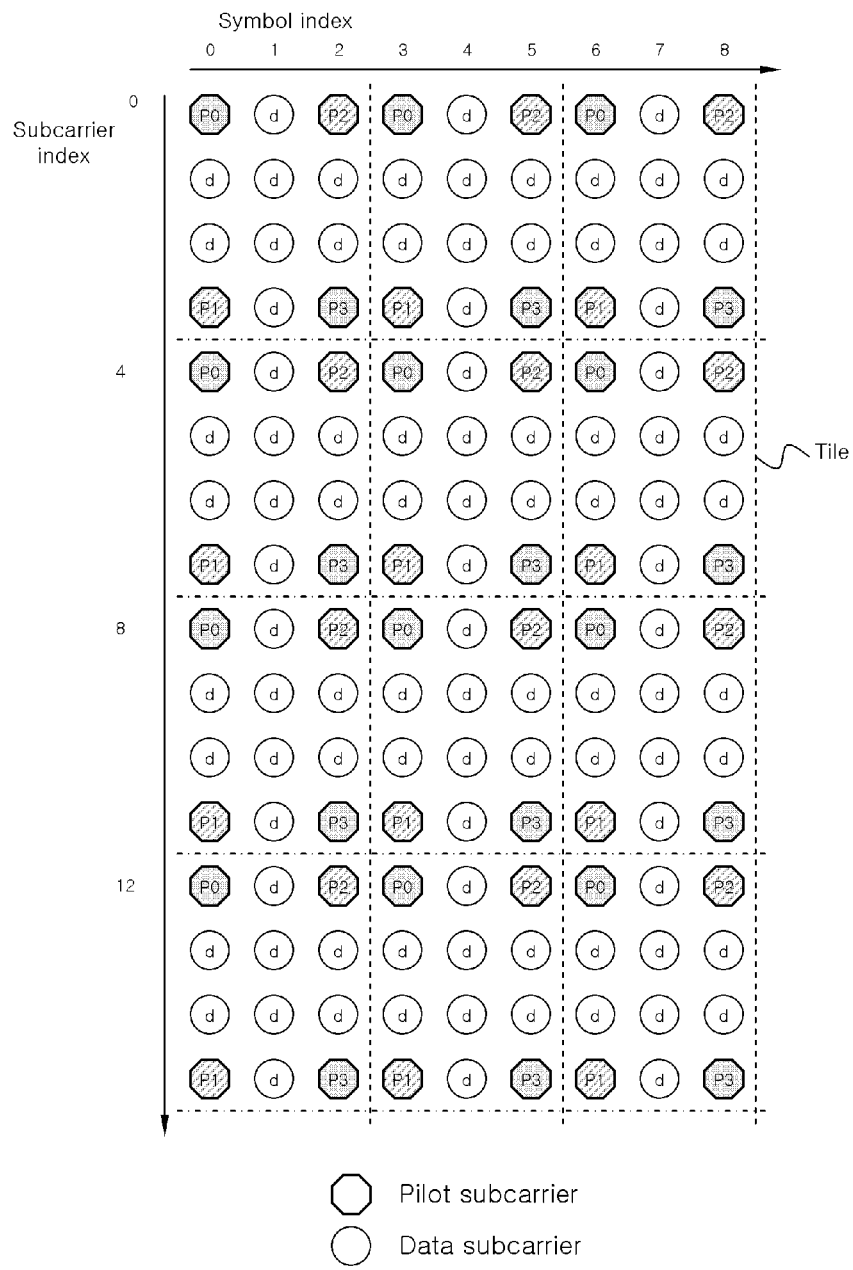
FIG. 2 is a detailed structure diagram for an uplink PUSC subchannel region of the frame illustrated in FIG. 1.

In the meantime, in case the 1024 FFT (Fast Fourier Transform) is used among subcarrier allocation schemes for the uplink PUSC mode, the allocation can be performed as shown in the following table 1. FIG. 2 illustrates part of a subcarrier allocation structure according to Table 1.

TABLE 1

| Parameter | Value | Comments |
| --- | --- | --- |
| Number of DC Subcarriers | 1 | Index 512 |
| Number of Guard Subcarriers, Left | 92 | |
| Number of Guard Subcarriers, Right | 91 | |
| Number of Used Subcarriers | 840 | Number of all subcarriers used within a symbol |
| Number of Subchannels | 35 | |
| Number of Tiles | 210 | |
| Number of Tiles per Subchannel | 6 | |
| Number of Subcarriers per Tile | 12 | Number of all subcarriers used within tile |

Referring to Table 1 and FIG. 2, in the uplink PUSC mode using 1024 FFT, 92 and 91 subcarriers on the right and left side among the 1024 subcarriers are used respectively as a safeguard region for alleviating the interference with neighboring channels, while one is used as a DC subcarrier. Further, 840 subcarriers excepting such subcarriers are used as valid subcarriers. In this case, the tile which is formed by four consecutive subcarriers and three consecutive symbol is set as a basic unit.

In the meantime, the present invention is applied to the MIMO system which performs the multiple input and multiple output transmission by using a plurality of transmitting antennas and a plurality of receiving antennas. Hereinafter, referring to FIGS. 3 to 6, the MIMO system will be illustrated.

Firstly, FIG. 3 is a drawing illustrating the outline of the SISO system and the MIMO system.

As shown in FIG. 3*a*, the SISO system performs the single input and single output transmission through one channel H which is formed between a transmitting antenna TxAnt and a receiving antenna RxAnt.

Unlike the above configuration, the MIMO system performs the multiple input and multiple output transmission through a plurality of channels which are formed between a plurality of transmitting antennas and a plurality of receiving antennas. FIG. 3*b* illustrates a 2×2 MIMO system using two transmitting antennas and two receiving antennas. As shown in the drawing, four channels, that is, a first channel H00, a second channel H01, a third channel H10, and a fourth channel H11 are formed between a first, a second transmitting antennas TxAnt0, TxAnt1, and a first, a second receiving antennas RxAnt0, RxAnt1. For reference, in marking the channel, the first index is related to the index of a receiving antenna, and the second index is related to the index of a transmitting antenna.

FIG. 4 exemplifies the uplink collaborative MIMO system which is performed between two terminals (Mobile Station/Portable Subscriber Station) and one base station (Radio Access Station) among 2×2 MIMO system. In brief, a first terminal performs transmission through a first transmitting antenna (TxAnt0) and, a second terminal performs transmission through a second transmitting antenna (TxAnt1) respectively with a different pilot pattern. Then, the received signal of a first channel and a third channel transmitted from a first terminal and the received signal of a second channel and a fourth channel transmitted from a second terminal are transmitted through the same subcarrier with a different pilot pattern in spatial multiplexing. The base station equipped with the first and the second receiving antenna (RxAnt0, RxAnt1) receives the signals transmitted from the first terminal and the second terminal respectively.

Figure 5:
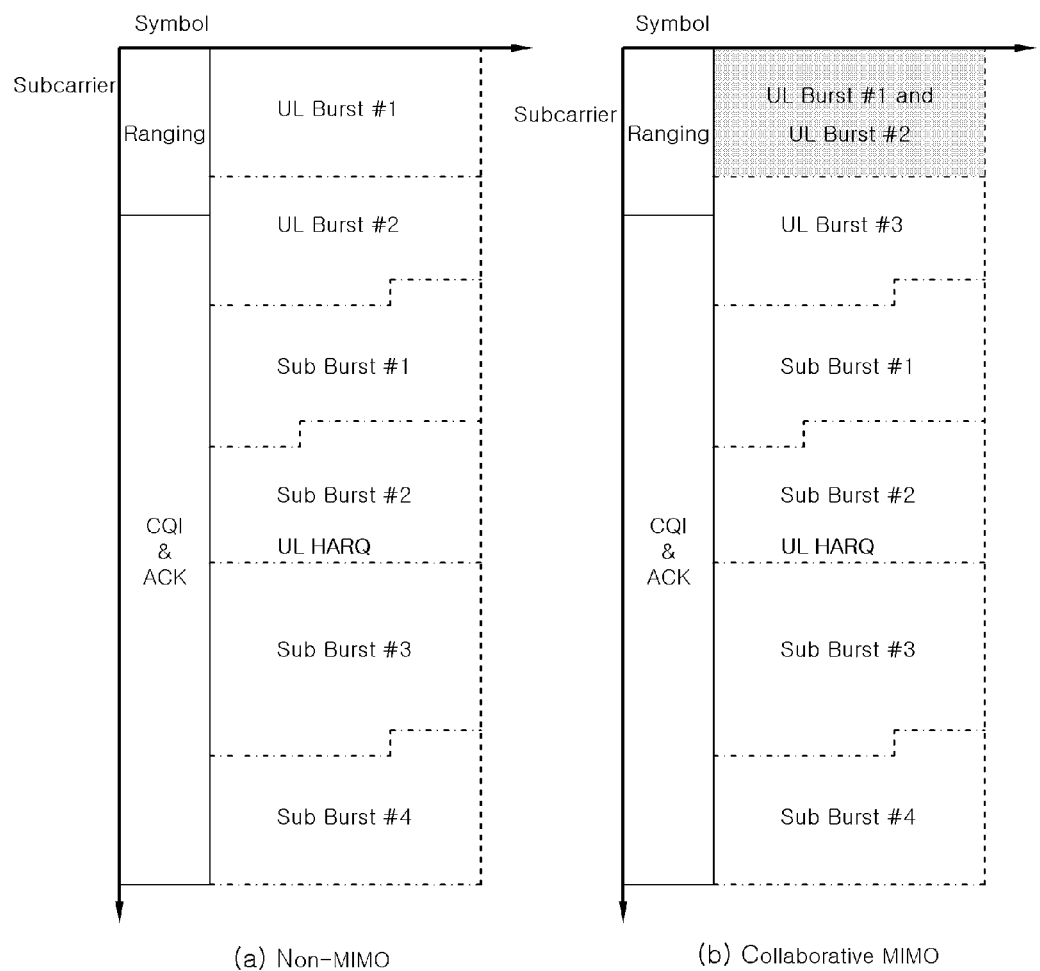
FIG. 5 is a drawing showing a resource allocation method in case of non-MIMO, and in case of the collaborative MIMO.

For reference, FIG. 5 illustrates the example of the resource allocation method, in case of non-MIMO (FIG. 5a) and in case of the collaborative MIMO (FIG. 5b). Referring to FIG. 5, in case of the collaborative MIMO, it can be known that more data can be transmitted with the restricted resources.

Figure 6:
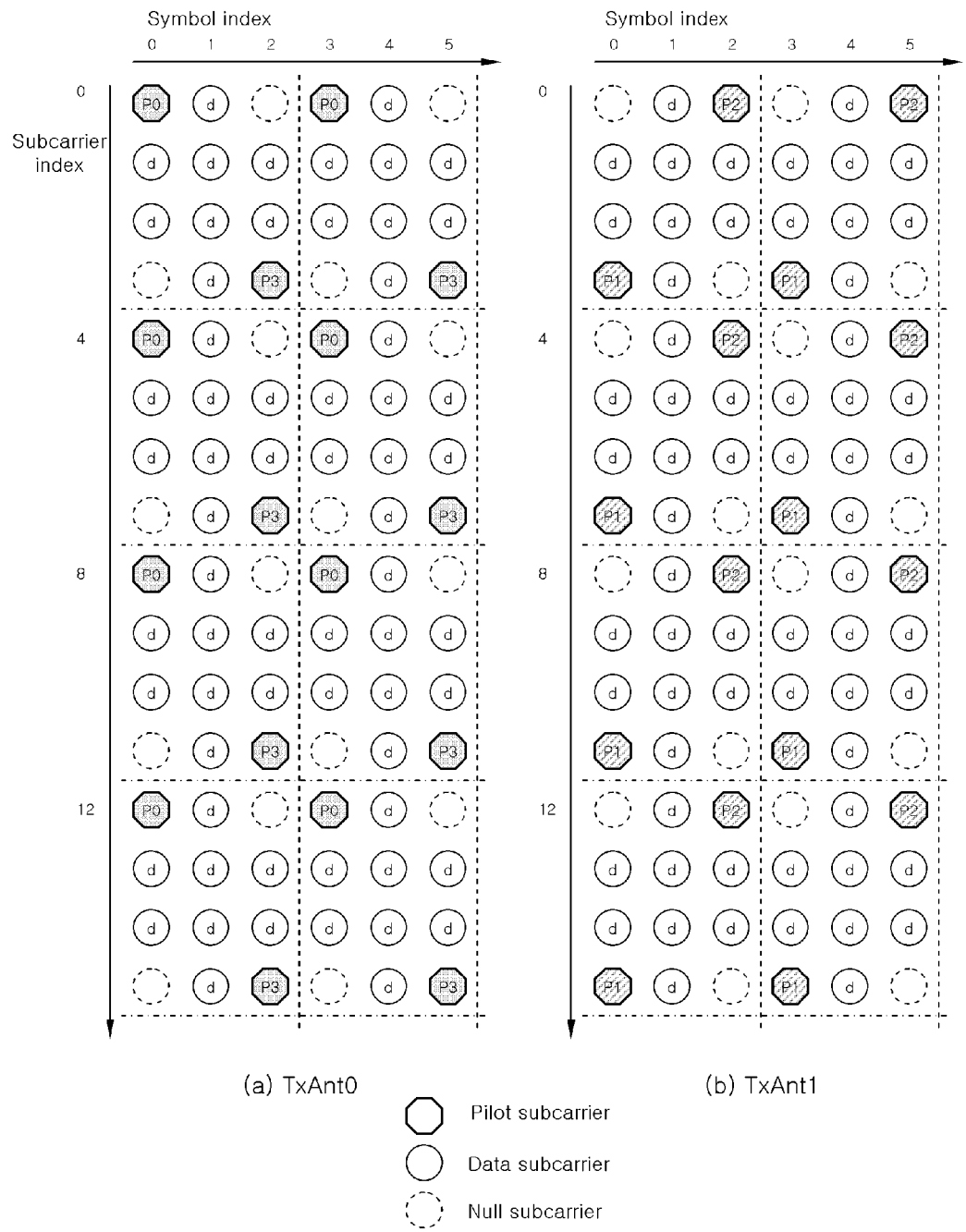
FIG. 6 is a drawing showing a pilot pattern of the PUSC mode in which a first transmitting antenna and a second transmitting antenna transmit respectively in a 2×2 MIMO system.

In connection with this, FIG. 6 shows a pilot pattern transmitted by the first transmitting antenna (TxAnt0) and the second transmitting antenna (TxAnt1) respectively for the uplink PUSC mode of 2×2 MIMO system.

Referring to FIG. 6, the first transmitting antenna TxAnt0 transmits pilots and data with a pattern illustrated in FIG. 6a, and the second transmitting antenna TxAnt1 transmits pilots and data with a pattern illustrated in FIG. 6b. The first receiving antenna RxAnt0 receives a first and a second received signal (that is, a received signal of the first and the second channel) through the first and the second channel H00, H01, respectively, and the second receiving antenna RxAnt1 receives a third and a fourth received signal (that is, a received signal of the third and the fourth channel) through the third and the fourth channel H10, H11, respectively. Thus, the first and the second receiving antennas receive all signals transmitted from the two transmitting antennas.

Figure 7:
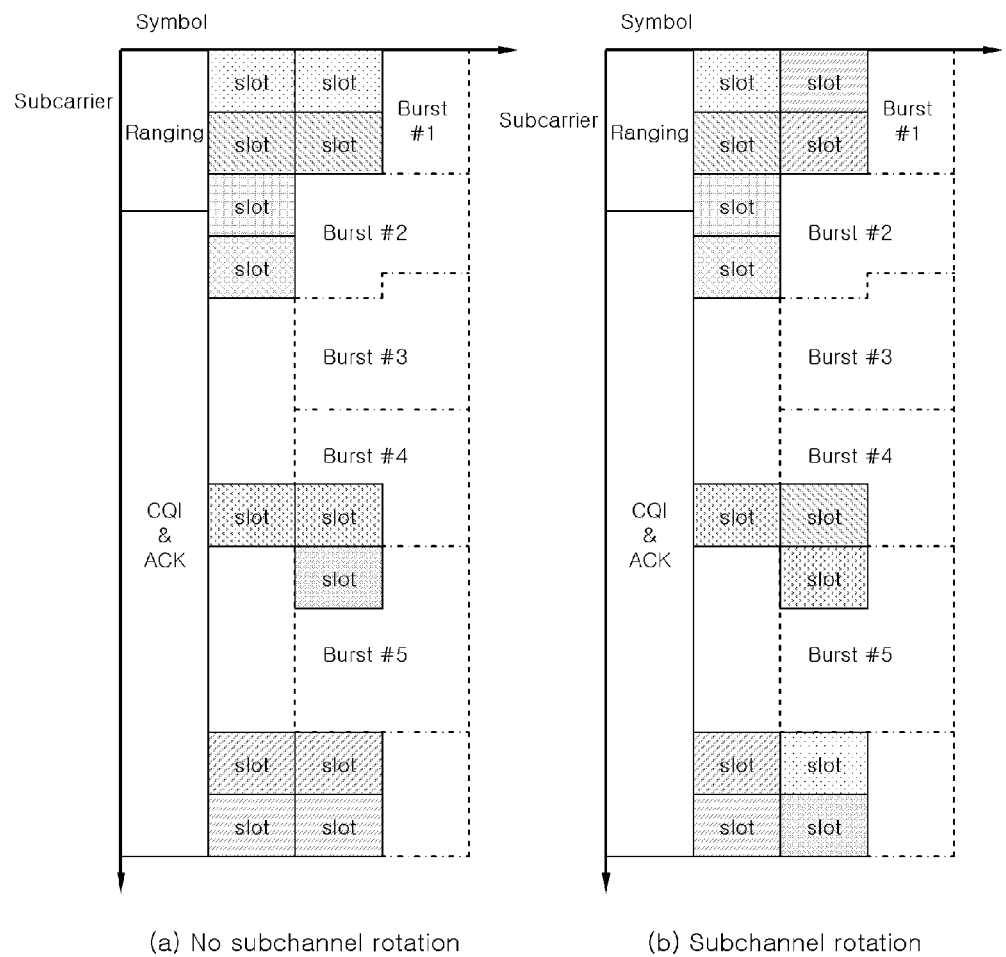
FIG. 7 is a drawing showing the case where a mapping rule has the subchannel rotation, and the case where the mapping rule has no subchannel rotation.

In the meantime, FIG. 7 shows a subchannel mapping example for the uplink PUSC region. Here, FIG. 7a exemplifies the case where subchannel rotation does not exist, FIG. 7b exemplifies the case where subchannel rotation exists.

As shown in FIG. 7a, in case of no subchannel rotation in the subchannel mapping, each terminal transmits signals by using the same subcarrier (that is, without the change of subcarrier) for the consecutive OFDMA symbols. Accordingly, the base station can estimate a corresponding channel for each terminal by using pilots included in the adjacent tiles of two or more, which are transmitted through the same subcarrier.

On the other hand, as shown in FIG. 7b, in case the slot allocated to each terminal rotates according to the OFDMA symbol, the base station cannot use the pilot included in the tile following in the direction of the OFDMA symbol axis. Accordingly, the channel is estimated by using only the pilot included in the individual tile. For reference, in FIG. 7, the logical map which is not an actual physical map was used so as to illustrate the concept of the subchannel rotation in the subchannel mapping.

Hereinafter, referring to FIGS. 8 to 20, the apparatus and method for channel estimating according to a first embodiment of the present invention will be explained. For reference, this embodiment relates to the apparatus and method for channel estimating in 2×2 MIMO system. The uplink PUSC mode used in the present embodiment adapts the above described pilot pattern.

Figure 8:
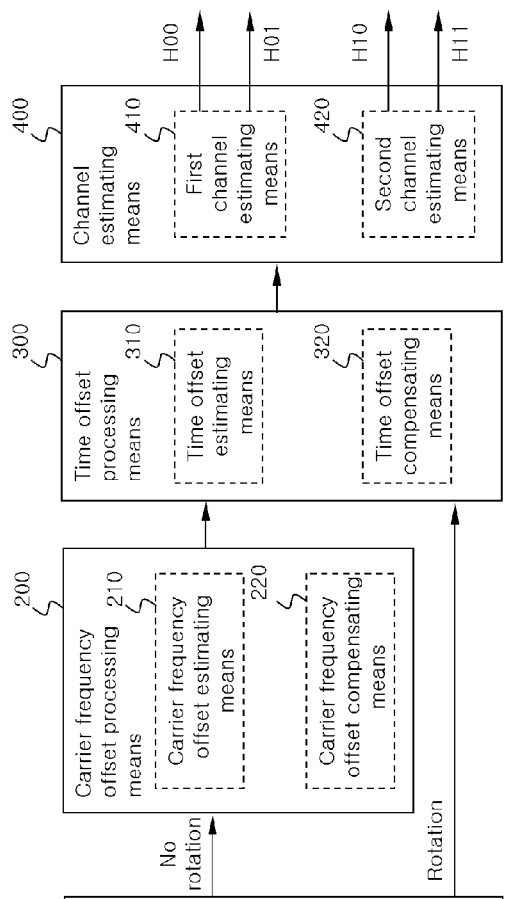
FIG. 8 is a configuration diagram of a channel estimating apparatus according to a first embodiment of the present invention.

As shown in FIG. 8, the channel estimating apparatus includes a FFT (Fast Fourier Transform) means 100, a subchannel mapping rule determining means 150, a carrier frequency offset processing means 200, a time offset processing means 300, and a channel estimating means 400.

The FFT means 100 transforms the signal of the time domain, which is received through a first and a second receiving antenna of a terminal respectively and converted into a signal of baseband, into a signal of the frequency domain. Here, the FFT means 100 can be comprised of a first FFT means 110 and a second FFT means 120. In this case, the first FFT means 110 converts the received signal of the first channel and the second channel of the time domain, which is received through the first receiving antenna, into the signal of the frequency domain. The second FFT means 120 converts the received signal of the third channel and the fourth channel of the time domain, which is received through the second receiving antenna, into the signal of the frequency domain. Of course, the FFT means 100 can be divided into four parts so as to convert the signal of the time domain received in each channel H00, H01, H10, H11 into the signal of the frequency domain, whereas the signals of time domain can be converted into the signals of the frequency domain in one FFT means.

The subchannel mapping rule determining means 150 determines the subchannel mapping rule for the OFDMA symbol in the uplink PUSC region, thereafter, based on it, selectively transmitting the signal (the received signal of the first channel or the fourth channel) of the frequency domain transmitted from the FFT means 100 to the carrier frequency offset processing means 200 or the time offset processing means 300.

That is, the subchannel mapping rule determining means 150 determines the subchannel mapping rule with reference to the UL_ZONE_IE (in detail, the Disable subchannel rotation bit: 0=subchannel rotation enable, 1=subchannel rotation disable) included in the UL_MAP of the downlink frame. In case of no rotation of a subchannel, the signal transmitted from the FFT means 100 is transmitted to the carrier frequency offset processing means 200. In case of the rotation of a subchannel, the signal transmitted from the FFT means 100 is transmitted to the time offset processing means 300. For reference, in the embodiment illustrated in FIG. 8, the subchannel mapping rule determining means 150 is implemented between the FFT means 100 and the carrier frequency offset processing means 200, however, it is not necessary to be positioned between the FFT means 100 and the carrier frequency offset processing means 200. If the subchannel mapping rule determining means 150 can control the signal outputted form the FFT means 100 to be selectively transmitted to the carrier frequency offset processing means 200 or to the time offset processing means 300 according to the subchannel mapping rule, it can be implemented with any form which is publicly known.

The carrier frequency offset processing means 200 estimates and compensates the CFO (Carrier Frequency Offset) by using the signal of the frequency domain with no subchannel rotation transmitted from the subchannel mapping rule determining means 150. For this, the carrier frequency offset processing means 200 includes a carrier frequency offset estimating means 210 estimating the carrier frequency offset and a carrier frequency offset compensation means 220 compensating the estimated carrier frequency offset (refer to FIG. 8).

Hereinafter, referring to FIGS. 9 to 11, the carrier frequency offset estimating means 210 will be explained in detail.

Figure 9:
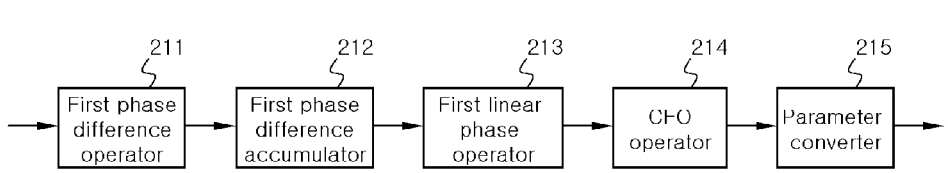
FIG. 9 is a detailed configuration diagram of a carrier frequency offset estimating means of FIG. 8.

As shown in FIG. 9, the carrier frequency offset estimating means 210 includes a first phase difference operator 211, a first phase difference accumulator 212, a first linear phase operator 213, a carrier frequency offset operator 214, and a parameter converter 215.

The first phase difference operator 211 calculates the phase difference according to the carrier frequency offset by using two or more pilots included in at least one received signal among the received signals of the first and the second channel (the first received signal and the second received signal) which are received through the first receiving antenna, and the received signal of the third and the fourth channel (the third received signal and the fourth received signal) which are received through the second receiving antenna.

In order to accurately calculate the phase difference according to the carrier frequency offset, the time offset should not be reflected. For this, two or more pilots having the same subcarrier index can be selected to calculate the phase difference according to the carrier frequency offset. Alternatively, the phase difference according to the carrier frequency offset can be calculated by using two or more pilots in which the time offset is compensated. The phase difference operator, for example, can be implemented with the form of a multiplier performing the conjugate multiplication for two complex numbers.

The first phase difference accumulator 212 generates a phase difference accumulation value by accumulating respective phase difference according to the respective carrier frequency offset, which is calculated in the first phase difference operator 211. The first phase difference accumulator 212 can estimate more accurate carrier frequency offset by accumulating the phase differences calculated for much more pilots. For reference, the phase difference accumulator can be implemented as an adder.

The first linear phase operator 213 transforms the phase difference accumulation value, which is accumulated in the first phase difference accumulator 212, into a linear phase $\theta_{CFO}$ according to the carrier frequency offset. The phase difference accumulation value can be expressed as complex number. Accordingly, as to the phase difference accumulation value with the form in which a real number part is the denominator while an imaginary number part is the numerator, after the arctan operation is performed, the result is divided by the difference of the symbol index of pilot used in the phase difference operation, thereby, the linear phase according to the carrier frequency offset can be obtained. Here, the arctan operation can be performed by using a look-up table in which the input is the ratio of a real number part and an imaginary number part while the output is the calculated value by the arctan operation. Of course, the linear phase can also be obtained by using another well known method.

The transformed linear phase $\theta_{CFO}$ for the carrier frequency offset indicates an average phase difference for the carrier frequency offset which occurs between neighboring symbols (where the difference of the symbol index is 1) having the same subcarrier index.

The carrier frequency offset operator 214 transforms the linear phase $\theta_{CFO}$ according to the carrier frequency offset, which is operated in the first linear phase operator 213, into the carrier frequency offset CFO. For example, when an OFDMA symbol duration has 115.2□ in a frame, the carrier frequency offset CFO can be calculated according to the following Equation 1.

[Equation 1]

$$CFO = \theta_{CFO} \times \frac{10^7}{2\pi \times 1152}$$

The parameter converter 215 converts the carrier frequency offset, which is measured in a radian unit, into an Hz (Hertz) value.

Hereinafter, referring to FIGS. 10 and 11, several methods estimating the carrier frequency offset will be exemplified. For reference, the following carrier frequency offset estimating methods has a prior condition that subchannel rotation does not applied and subcarrier assignment is performed to the slot which is adjacent in the direction of the OFDMA symbol axis.

First, it is method which calculates the phase difference according to the carrier frequency offset by using a pilot pair having the same subcarrier index (hereinafter, 'a first carrier frequency offset estimation method'). In this case, it is preferable that the difference of symbol index of the pilot pair is a multiple of 3.

Referring to FIG. 10a, as to the first received signal and/or the third received signal in the uplink PUSC mode, in case of the subcarrier index k, the pilot 'P0($P_{k,l}$)' is positioned in the symbol index l, while the pilot 'P0($P_{k,l+3}$)' is positioned in the symbol index l+3. Hence, the pilot P0($P_{k,l}$) and P0($P_{k,l+3}$) have the same subcarrier index, while the difference of symbol index is 3. Therefore, it can be known that the phase difference corresponding to the triple of the linear phase according to the carrier frequency offset is generated.

Referring to FIG. 10b, in case of the subcarrier index k+3, the pilot 'P3($P_{k+3,l+2}$)' is positioned in the symbol index l+2 and the pilot 'P3($P_{k+3,l+5}$)' is positioned in the symbol index l+5. Similarly, the carrier frequency offset can be obtained by using this. Here, as to the notation of the pilot, P0 (a first pilot), P1 (a second pilot), P2 (a third pilot), P3 (a fourth pilot) are expressed based on the location of the pilot included in one tile. $P_{k,l}$ is expressed based on the subcarrier index (k) and the symbol index (l).

In the meantime, the following Equation 2 generalizes this. Equation (2-1) produces the linear phase according to the carrier frequency offset by using the position relation between two first pilots (P0) having the same subcarrier index (refer to FIG. 10a). Equation (2-1) produces the linear phase according to the carrier frequency offset by using the position relation between two fourth pilots (P3) having the same subcarrier index (refer to FIG. 10b). Here, k indicates a subcarrier index, l indicates a symbol index, m indicates a receiving antenna index, t indicates a tile index, TileNum indicates the number of tile for accumulating, w indicates a weight. For reference, the weight can be calculated based on the magnitude of the subcarrier signal, the CINR (Carrier to Interference and Noise Ratio) etc.

[Equation 2]

$$\theta_{CFO} = \frac{1}{3} \cdot \tan^{-1} \left\{ \frac{\mathrm{Im}\left\{ \sum_{t=1}^{TileNum} \sum_{m=0}^{1} \left( \frac{p_{k,j}(m,t) \cdot p_{k,j+3}(m,t)^*}{|p_{k,j}(m,t) \cdot p_{k,j+3}(m,t)^*|} \right) \cdot w(m,t) \right\}}{\mathrm{Re}\left\{ \sum_{t=1}^{TileNum} \sum_{m=0}^{1} \left( \frac{p_{k,j}(m,t) \cdot p_{k,j+3}(m,t)^*}{|p_{k,j}(m,t) \cdot p_{k,j+3}(m,t)^*|} \right) \cdot w(m,t) \right\}} \right\} \quad (2\text{-}1)$$

$$\theta_{CFO} = \frac{1}{3} \cdot \tan^{-1} \left\{ \frac{\mathrm{Im}\left\{ \sum_{t=1}^{TileNum} \sum_{m=0}^{1} \left( \frac{p_{k+3,j+2}(m,t) \cdot p_{k+3,j+5}(m,t)^*}{|p_{k+3,j+2}(m,t) \cdot p_{k+3,j+5}(m,t)^*|} \right) \cdot w(m,t) \right\}}{\mathrm{Re}\left\{ \sum_{t=1}^{TileNum} \sum_{m=0}^{1} \left( \frac{p_{k+3,j+2}(m,t) \cdot p_{k+3,j+5}(m,t)^*}{|p_{k+3,j+2}(m,t) \cdot p_{k+3,j+5}(m,t)^*|} \right) \cdot w(m,t) \right\}} \right\} \quad (2\text{-}2)$$

Second, it is the method that calculate the phase difference according to the carrier frequency offset by using two pairs of pilots having the same subcarrier index difference (hereinafter, 'a second carrier frequency offset estimating method'). Here, it dose not mean that two pairs of pilots are inevitably four pilots, and as it will be described later, it includes the case in which one pilot is in common.

Figure 11:
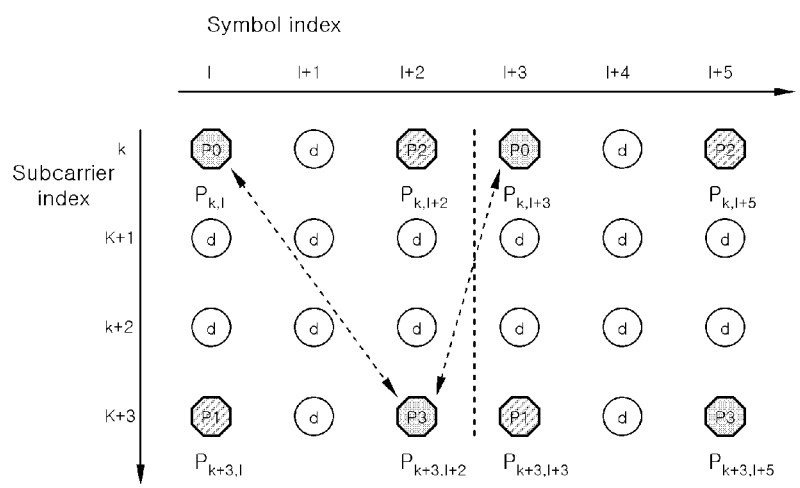
FIG. 11 is a drawing illustrating the estimation method of a second carrier frequency offset according to the present invention in case of no subchannel rotation.

Referring to FIG. 11, the linear phase according to the time offset can be offset in case of by using the relation (all subcarrier index difference is 3) of the pilot pair of pilot P0($P_{k,l}$) having the subcarrier index k and symbol index l and the pilot P3($P_{k+3,l+2}$) having the subcarrier index k+3 and symbol index l+2, and the pilot pair of pilot P3($P_{k+3,l+2}$) (it is a common pilot) having the subcarrier index k+3 and symbol index l+2 and the pilot P0($P_{k,l+3}$) having the subcarrier index k and symbol index l+3, thereby, the linear phase according to the carrier frequency offset can be obtained.

Following Equation 3 is an example of generalizing this, showing the result of the linear phase according to the carrier frequency offset calculated in the first linear phase operator 213 by using the position relation of three pilots. Here, k indicates a subcarrier index, l indicates a symbol index, m indicates a receiving antenna index, t indicates a tile index, TileNum indicates the number of tile for accumulating, w indicates a weight.

[Equation 3]

$$\theta_{CFO} = \frac{1}{6} \left[ \tan^{-1}\left\{ \frac{\mathrm{Im}\left\{ \sum_{t=1}^{TileNum} \sum_{m=0}^{1} \left( \frac{p_{k,j}(m,t) \cdot p_{k+3,j+2}(m,t)^*}{|p_{k,j}(m,t) \cdot p_{k+3,j+2}(m,t)^*|} \right) \cdot w(m,t) \right\}}{\mathrm{Re}\left\{ \sum_{t=1}^{TileNum} \sum_{m=0}^{1} \left( \frac{p_{k,j}(m,t) \cdot p_{k+3,j+2}(m,t)^*}{|p_{k,j}(m,t) \cdot p_{k+3,j+2}(m,t)^*|} \right) \cdot w(m,t) \right\}} \right\} + \tan^{-1}\left\{ \frac{\mathrm{Im}\left\{ \sum_{t=1}^{TileNum} \sum_{m=0}^{1} \left( \frac{p_{k+3,j+2}(m,t) \cdot p_{k,j+3}(m,t)^*}{|p_{k+3,j+2}(m,t) \cdot p_{k,j+3}(m,t)^*|} \right) \cdot w(m,t) \right\}}{\mathrm{Re}\left\{ \sum_{t=1}^{TileNum} \sum_{m=0}^{1} \left( \frac{p_{k+3,j+2}(m,t) \cdot p_{k,j+3}(m,t)^*}{|p_{k+3,j+2}(m,t) \cdot p_{k,j+3}(m,t)^*|} \right) \cdot w(m,t) \right\}} \right\} \right]$$

In the meantime, besides the exemplified method described above, by using another combination of the pilot, the linear phase according to the carrier frequency offset can be obtained.

The linear phase $\theta_{CFO}$ according to the carrier frequency offset is transformed into the carrier frequency offset (CFO) value of a radian unit in the carrier frequency offset operator 214, and it is transformed again into the Hz (Hertz) value in the parameter converter 215. The carrier frequency offset compensation means 220 performs the function of compensating the carrier frequency offset which is estimated like that.

For reference, the description described above exemplifies the process of obtaining the carrier frequency offset for the first and the third received signal transmitted from the first transmitting antenna, while the carrier frequency offset for the second and the fourth received signal transmitted from the second transmitting antenna can be obtained through the same method.

A time offset processing means 300 estimates and compensates the TO (Time Offset) by using the signal of the frequency domain transmitted from the carrier frequency offset processing means 200 or the subchannel mapping rule determining means 150. Here, the signal transmitted from the carrier frequency offset processing means 200 is a signal having no subchannel rotation, and the signal transmitted to the time offset processing means from the subchannel mapping rule determining means 150 is a signal which has the subchannel rotation.

As shown in FIG. 8, the time offset processing means 300 includes a time offset estimating means 310 estimating the time offset and a time offset compensation means 320 compensating the estimated time offset. Hereinafter, the time offset processing means 300 will be explained in detail with reference to FIGS. 12 to 14.

Figure 12:
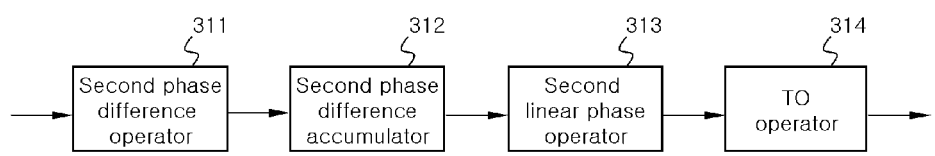
FIG. 12 is a detail configuration diagram of a time offset estimating means of FIG. 8.

Referring to FIG. 12, the time offset estimating means 310 includes a second phase difference operator 311, a second phase difference accumulator 312, a second linear phase operator 313, and a time offset (TO) operator 314.

The second phase difference operator 311 calculates the phase difference according to the time offset by using two or more pilots included at least one received signal among the received signals of a first signal and a second signal received through a first receiving antenna and the received signals of a third channel and a fourth channel received through a second receiving antenna.

The second phase difference accumulator 312 accumulates the phase difference according to each time offset calculated in the second phase difference operator 311 and generates the phase difference accumulative value. By accumulating the phase difference which is calculated for much more pilots, the second phase difference accumulator 312 can estimate the more exact time offset.

The second linear phase operator 313 converts the phase difference accumulative value accumulated in the second phase difference accumulator 312 into the linear phase ($\theta_{TO}$) according to the time offset. The linear phase ($\theta_{TO}$) according to the time offset obtained by such method indicates the average phase difference according to the time offset which is generated between adjacent subcarriers (that is, subcarriers in which the difference of subcarrier index is 1)

The time offset operator 314 converts the linear phase ($\theta_{TO}$) according to the time offset calculated in the second linear phase operator 313 into the time offset (TO). For example, the time offset (TO) can be calculated by following Equation 4 in case of using 1024 FFT like the present embodiment.

[Equation 4]

$$TO = \theta_{TO} \times \frac{1024}{2\pi}$$

Hereinafter, referring to FIG. 13, the method of estimating the time offset for a signal (in case of no subchannel rotation) transmitted from the carrier frequency offset processing means will be illustrated.

In the present embodiment, by using a pilot pair in which the carrier frequency offset is compensated while having a different subcarrier index, the phase difference according to the time offset is calculated. For reference, in FIG. 13, $\tilde{p}$ indicates a pilot in which the carrier frequency offset is compensated.

As shown in FIG. 13a, by using a pilot pair, in which the carrier frequency offset is compensated, of the pilot P0($\tilde{p}_{k,l}$) having the subcarrier index k and the symbol index l and the pilot P3($\tilde{p}_{k+3,l+2}$) having subcarrier index k+3 and the symbol index l+2. Similarly, as shown in FIG. 13b, by using a pilot pair, in which the carrier frequency offset is compensated, of the pilot P0($\tilde{p}_{k,l+3}$) having the subcarrier index k and the symbol index l+3 and the pilot P3($\tilde{p}_{k+3,l+2}$) having subcarrier index k+3 and the symbol index l+2.

The following equation 5 indicates an example of the generalization of this. Here, k indicates a subcarrier index, l indicates a symbol index, m indicates a receiving antenna index, t indicates a tile index, TileNum indicates the number of tile for accumulating, w indicates a weight.

[Equation 5]

$$\theta_{TO} = \frac{1}{3} \cdot \tan^{-1}\left\{\frac{\mathrm{Im}\left\{\sum_{t=1}^{TileNum}\sum_{m=0}^{1}\left(\frac{\hat{p}_{k,j}(m,t)\cdot \hat{p}_{k+3,j+2}(m,t)^*}{\left|\hat{p}_{k,j}(m,t)\cdot \hat{p}_{k+3,j+2}(m,t)^*\right|}\right)\cdot w(m,t)\right\}}{\mathrm{Re}\left\{\sum_{t=1}^{TileNum}\sum_{m=0}^{1}\left(\frac{\hat{p}_{k,j}(m,t)\cdot \hat{p}_{k+3,j+2}(m,t)^*}{\left|\hat{p}_{k,j}(m,t)\cdot \hat{p}_{k+3,j+2}(m,t)^*\right|}\right)\cdot w(m,t)\right\}}\right\} \quad (5\text{-}1)$$

$$\theta_{TO} = \frac{1}{3} \cdot \tan^{-1}\left\{\frac{\mathrm{Im}\left\{\sum_{t=1}^{TileNum}\sum_{m=0}^{1}\left(\frac{\hat{p}_{k,j+3}(m,t)\cdot \hat{p}_{k+3,j+2}(m,t)^*}{\left|\hat{p}_{k,j+3}(m,t)\cdot \hat{p}_{k+3,j+2}(m,t)^*\right|}\right)\cdot w(m,t)\right\}}{\mathrm{Re}\left\{\sum_{t=1}^{TileNum}\sum_{m=0}^{1}\left(\frac{\hat{p}_{k,j+3}(m,t)\cdot \hat{p}_{k+3,j+2}(m,t)^*}{\left|\hat{p}_{k,j+3}(m,t)\cdot \hat{p}_{k+3,j+2}(m,t)^*\right|}\right)\cdot w(m,t)\right\}}\right\} \quad (5\text{-}2)$$

In addition to the exemplified method as described above, by using another combination of pilot, the linear phase according to the time offset can be obtained.

Figure 14:
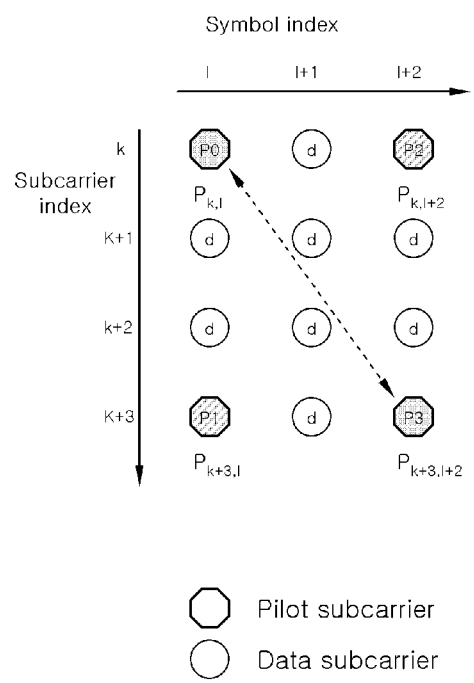
FIG. 14 is a drawing illustrating the estimation method of a time offset according to the present invention in case of subchannel rotation.

FIG. 14 is a drawing illustrating the method of estimating a time offset for a signal transmitted from a subchannel mapping rule determining means (in case of performing a subchannel rotation).

The signal transmitted from the subchannel mapping rule determining means is a signal in which the carrier frequency offset is not compensated, and, therefore, in this case, the phase difference according to the time offset is calculated by ignoring the carrier frequency offset.

Referring to FIG. 14, in case of performing a subchannel rotation, the adjacent tile is not used, but the pilot included in the tile is used. For example, by using a pilot pair of the pilot P0($P_{k,l}$) having the subcarrier index k and the symbol index l and the pilot P3($P_{k+3,l+2}$) having the subcarrier index k+3 and the symbol index l+2, the time offset is estimated. Additionally, the time offset compensation means 320 compensates the time offset which is estimated like this.

Finally, the channel estimating means 400 estimates a channel for the first to the fourth received signal with a different method respectively according to the subchannel mapping rule. Hereinafter, referring to FIGS. 15 to 19, it will be explained in detail.

Referring to FIGS. 15 to 17, the channel estimating method will be illustrated in case of no subchannel rotation in the subchannel mapping rule. In this case, by using two or more pilots which are included in two or more tiles corresponding to the same subcarrier, the channel is estimated.

First, it is the method (hereinafter, 'averaging method') in which the averaging of pilots included in each received signal which is received in the same receiving antenna after being transmitted from the same transmitting antenna is performed. That is, the channel estimating means 400 estimates the whole channel by averaging pilots for four channels (H00, H01, H10, H11) according to each channel. In this case, by classifying a frame into a block consisting of one or more tiles (it is transmitted from the same terminal) and averaging pilots included in each block to estimate the channel for a corresponding block, the whole channel can be estimated.

In addition, after multiplying each pilot by the weight before averaging the pilot, the channel can be estimated. The averaging method described has the advantage in that it can be simply implemented and the computational complexity for the channel estimation is reduced.

Second, it is the method (hereinafter, 'interpolation method') in which the interpolation of pilots included in each received signal which is received in the same receiving antenna after being transmitted from the same transmitting antenna is performed. For example, in case of the first channel (H00), by using the pilot having the same subcarrier index for the interpolation in the direction of the symbol index axis, the channel of the symbol index axis is estimated.

That is, for the data which is positioned between two pilots on the symbol index axis, the interpolation is performed, whereas for the data which is not positioned between two pilots on the symbol index axis, the estimation value of the adjacent pilot is copied or the interpolation by using other pilot is performed, so that the channel of the symbol index axis is estimated. In this way, after estimating the channel of the symbol index axis, by interpolating in the direction of the subcarrier index axis with a similar method by using it, the channel of the subcarrier index axis is estimated.

FIGS. 15 through 17 indicate some examples of interpolation in connection with the first channel (H00) and/or the third channel (H10). For reference, FIG. 15 shows the case in which the channel of the symbol index axis is estimated by the interpolation in the direction of the symbol index axis while the estimation value of the data which is not positioned between two pilots copies the estimation value of the adjacent pilot, and by using this, the channel is estimated in the direction of the subcarrier index axis. In addition, FIG. 16 shows the case in which the estimation value of the data positioned between two pilots having the same subcarrier index is interpolated, while the estimation value of other data is interpolated by using the difference of index (symbol index, subcarrier index) based on it. Additionally, FIG. 17 shows the case in which the estimation value of the data positioned between two pilots having the same subcarrier index is interpolated, while the estimation value of other data is interpolated by using the difference of distance based on the location. In case of the second channel to the fourth channel (H01, H10, H11), they can be estimated with a similar method. Therefore, the whole channel can be estimated.

In the meantime, in case the subchannel rotation exists in the subchannel mapping rule, the pilots included in other adjacent tile in the direction of the OFDMA symbol axis cannot be used, so that the channel is estimated by using only pilots included in an individual tile. Here, the averaging method and the interpolation method also can be applied.

Firstly, the averaging method averages two pilots included in each tile for each channel (H00, H01, H10, H11). In this case, after multiplying each pilot by weight before averaging the pilot, the channel can be estimated.

Figure 18:
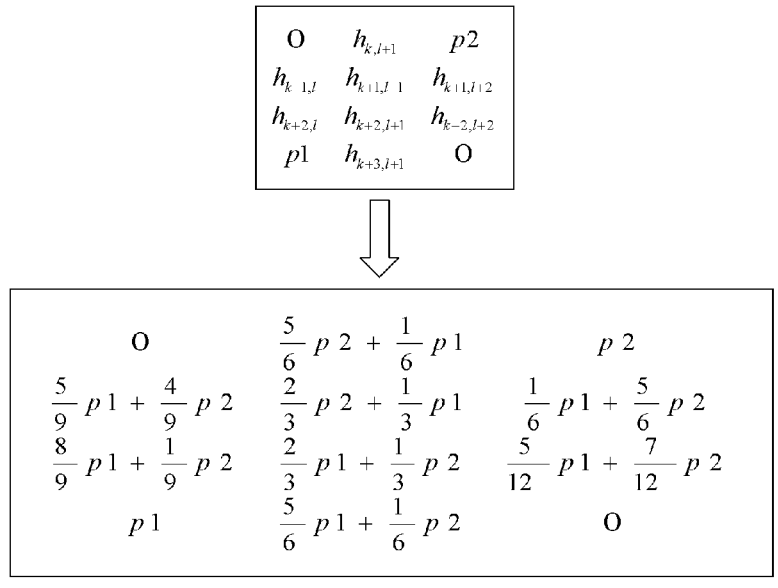
FIGS. 18 and 19 are drawings illustrating the estimation method of channel according to the present invention in case of subchannel rotation.
Figure 19:
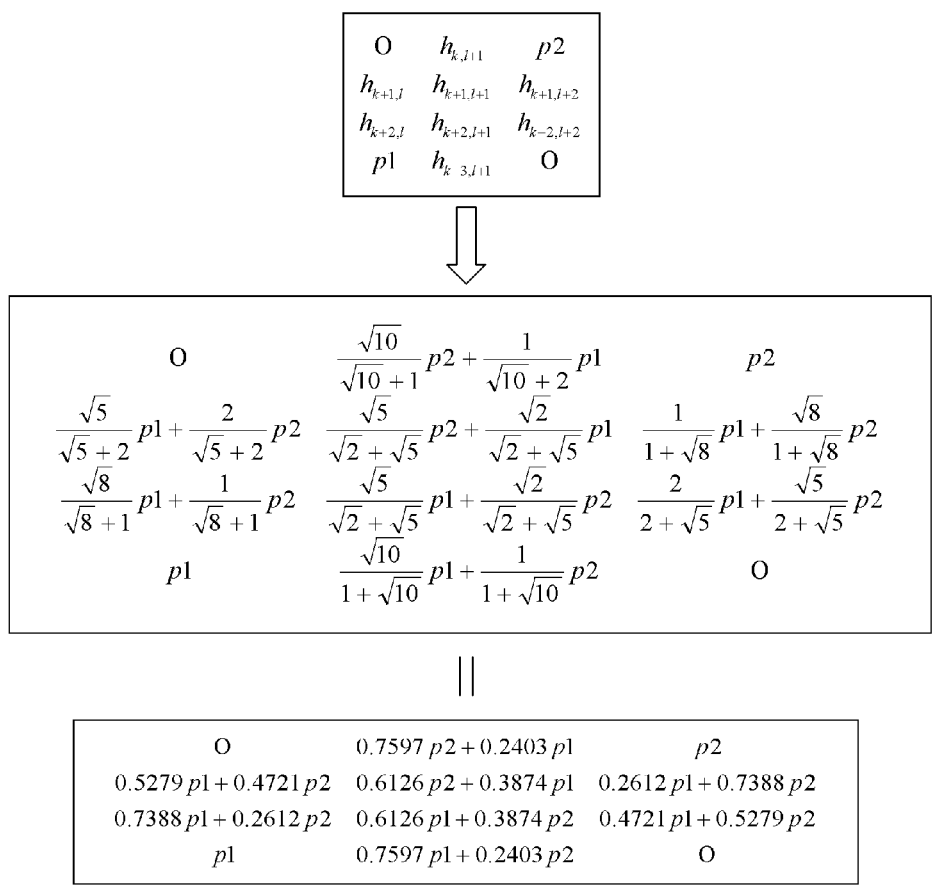

The interpolation method performs the interpolation by using two pilots included in each tile for each channel (H00, H01, H10, H11). FIGS. 18 and 19, in connection with the second channel (H01) and/or the fourth channel (H11), show the case in which each channel is estimated through the interpolation by using two pilots (P1, P2 in the drawing) included in one tile. For reference, FIG. 18 show the case in which the interpolation is performed by using the difference of index, FIG. 19 show the case in which the interpolation is performed by using the difference of distance.

Referring again to FIG. 8, in the illustrated embodiment, the channel estimating means 400 is divided into the first channel estimating means 410 estimating the first channel (H00) and the second channel (H01) relating to the first receiving antenna and the second channel estimating means 420 estimating the third channel (H10) and the fourth channel (H11) relating to the second receiving antenna. Of course, the channel estimating means 400 can be implemented to be divided into four parts so as to estimate each channel (H00, H01, H10, H11). On the contrary, it can be implemented to estimate all channels at one channel estimating means.

In the meantime, according to another embodiment of the present invention, after the subchannel mapping rule determining means 150 determines the subchannel mapping rule for each received signal, in case the subchannel rotation does not exist, it transmits the signal transmitted from the FFT means 100 to the carrier frequency offset processing means 200. On the other hand, in case of subchannel rotation, it transmits the signal transmitted from the FFT means 100 to the channel estimating means 400. In this case, unlike the above embodiments, the time offset is not estimated and not compensated for the received signal having the subchannel rotation, and the channel is immediately estimated.

Hereinafter, referring to FIG. 20, the channel estimating method according to the first embodiment of the present invention will be illustrated. For reference, now that the detailed process or the principles of operation for the channel estimating method can refer to the description of the above-described channel estimating apparatus, the overlapped detailed description will be omitted, and the steps which are time-serially generated will be illustrated.

Figure 20:
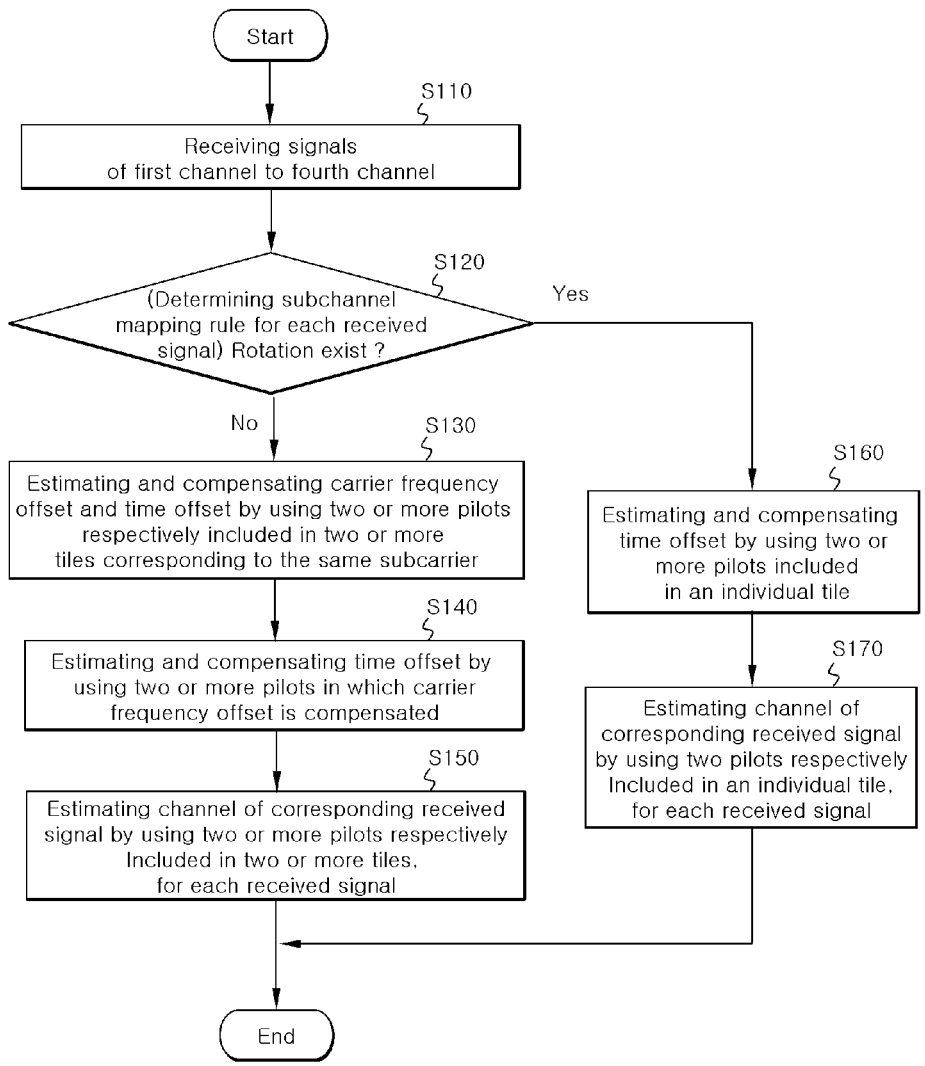
FIG. 20 is a flowchart of the estimation method of channel according to a first embodiment of the present invention.

Referring to FIG. 20, firstly, at step S110, the base station receive the signals of the first channel and the second channel through the first receiving antenna among a plurality of receiving antennas, and receive the signals of the third channel and the fourth channel through the second receiving antenna. Here, the received signal of the first channel and the third channel is a signal transmitted from the first transmitting antenna, while the received signal of the second channel and the fourth channel is a signal transmitted from the second transmitting antenna.

Further, the first transmitting antenna and the second transmitting antenna can be equipped in a different terminal, while the received signals of the first channel and the third channel and the received signals of the second channel and the fourth channel are transmitted with a different pilot pattern.

At step S120, the subchannel mapping rule is determined respectively for the received signal of the first channel to the fourth channel. As a result of determination at step S120, in case the subchannel rotation does not exist in the subchannel mapping rule, it proceeds to step S130, so that the channel estimation is performed after the carrier frequency offset and the time offset are estimated and compensated. On the other hand, in case the subchannel rotation exists in the subchannel mapping rule, it proceeds to step S160, so that the channel estimation is performed after the time offset is estimated and compensated.

In detail, the channel is estimated by using two or more pilots included respectively in two or more tiles corresponding to the same subcarrier with respect to the received signal having no subchannel rotation in the subchannel mapping rule. That is, at step S130, the carrier frequency offset is estimated and compensated by using two or more pilots included respectively in two or more tiles corresponding to the same subcarrier with respect to the received signal having no subchannel rotation in the subchannel mapping rule.

In this case, as to the pilot, it is preferable to utilize a pilot pair which has the same subcarrier index while the symbol index difference is a multiple of 3, or to utilize two pilot pairs which have the same subcarrier index difference.

As to the estimating of carrier frequency offset, after the phase difference according to the carrier frequency offset is calculated for the selected two or more pilots and the phase difference according to the calculated carrier frequency offset is accumulated, the linear phase according to the carrier frequency offset is calculated by using the phase difference according to the accumulated carrier frequency offset. In addition, it can be performed by calculating the carrier frequency offset based on the linear phase according to the carrier frequency offset.

In case the carrier frequency offset is estimated and compensated, at step S140, the time offset is estimated and compensated by using pilots in which the carrier frequency offset is compensated. In this case, it is preferable to use a pilot pair which has a different subcarrier index while the carrier frequency offset is compensated.

As to the estimating of time offset, after the phase difference according to the time offset is calculated for two or more pilots in which the carrier frequency offset is compensated and the phase difference according to the calculated time offset is accumulated, the linear phase according to the time offset is calculated by using the phase difference according to the accumulated time offset. In addition, it can be performed by calculating the time offset based on the linear phase according to the time offset.

In addition, at step S150, the channel is estimated by using the pilot in which the carrier frequency offset and the time offset are compensated. In this case, as to each received signal which has no subchannel rotation in the subchannel mapping rule, the channel of the received signal is estimated by using two or more pilots included respectively in two or more tiles corresponding to the same subcarrier. The channel estimation can be performed by averaging the pilots included in each received signal or performing the interpolation based on the index difference or the distance difference for two or more pilots included in the tile which is adjacent in the direction of OFDMA symbol axis.

In the meantime, the channel is estimated by using two pilots included in an individual tile with respect to the received signal having subchannel rotation in the subchannel mapping rule. That is, at step S160, by using two pilots included in an individual tile for the received signal having the subchannel rotation, the time offset is estimated and compensated.

At step S160, by using the pilot in which the time offset is compensated, the channel is estimated. In this case, as to the received signal having subchannel rotation in the subchannel mapping rule, it can be estimated by averaging or interpolating by using two pilots included in an individual tile.

Hereinafter, in a 2×2 collaborative MIMO wireless telecommunication system in which the communications is performed between the first terminal, the second terminal and one base station, the channel estimating method according to the invention will be exemplified for each case.

For reference, the first terminal is equipped with one first transmitting antenna, the second terminal is equipped with one second transmitting antenna, and the base station is equipped with the first receiving antenna and the second receiving antenna. Then, the received signals of the first channel and the third channel transmitted from the first terminal and the received signals of the second channel and the fourth channel transmitted from the second terminal are transmitted to the base station through the same subcarrier in a different pilot pattern with spatial multiplexing.

First, it is the channel estimating method in case all the received signals of the first channel to the fourth channel are signals which have no subchannel rotation. In this case, firstly, the received signals of the first channel to the fourth channel are received in the first receiving antenna and the second receiving antenna.

A first carrier frequency offset and a first time offset are estimated by using two or more pilots included in at least one received signal among the received signals of the first channel and the third channel transmitted from the first terminal. A second carrier frequency offset and a second time offset are estimated by using two or more pilots included in at least one received signal among the received signals of the second channel and the fourth channel transmitted from the second terminal.

Finally, the first channel and the third channel are estimated by using two or more pilots which are included in the received signals of the first channel and the third channel respectively while the first carrier frequency offset and the first time offset are compensated. The second channel and the fourth channel are estimated by using two or more pilots which are included in the received signals of the second channel and the fourth channel respectively while the second carrier frequency offset and the second time offset are compensated.

Second, it is the channel estimating method in case all the received signals of the first channel to the fourth channel are signals which have the subchannel rotation. In this case, also, the received signals of the first channel to the fourth channel are received in the first receiving antenna and the second receiving antenna.

A first time offset is estimated by using two or more pilots included in at least one received signal among the received signals of the first channel and the third channel transmitted from the first terminal. A second time offset is estimated by using two or more pilots included in at least one received signal among the received signals of the second channel and the fourth channel transmitted from the second terminal. Finally, the first channel and the third channel are estimated by using two or more pilots which are included in the received signals of the first channel and the third channel respectively while the first time offset is compensated. The second channel and the fourth channel are estimated by using two or more pilots which are included in the received signals of the second channel and the fourth channel respectively while the second time offset is compensated.

In the channel estimation of the above two cases, as to each received signal which has no subchannel rotation in the subchannel mapping rule, the channel of a corresponding received signal is estimated by using two or more pilots included respectively two or more tiles corresponding to the same subcarrier. In addition, as to the received signal having the subchannel rotation in the subchannel mapping rule, the channel is estimated by using two pilots included in an individual tile.

Hereinafter, the apparatus and method for channel estimating according to the second embodiment of the present invention will be explained with reference to FIGS. 21 to 27. For reference, the present embodiment relates to the apparatus and method for channel estimating applied to 2×2 MIMO system. The uplink PUSC mode used in the present embodiment applies the above-described pilot pattern.

Figure 21:
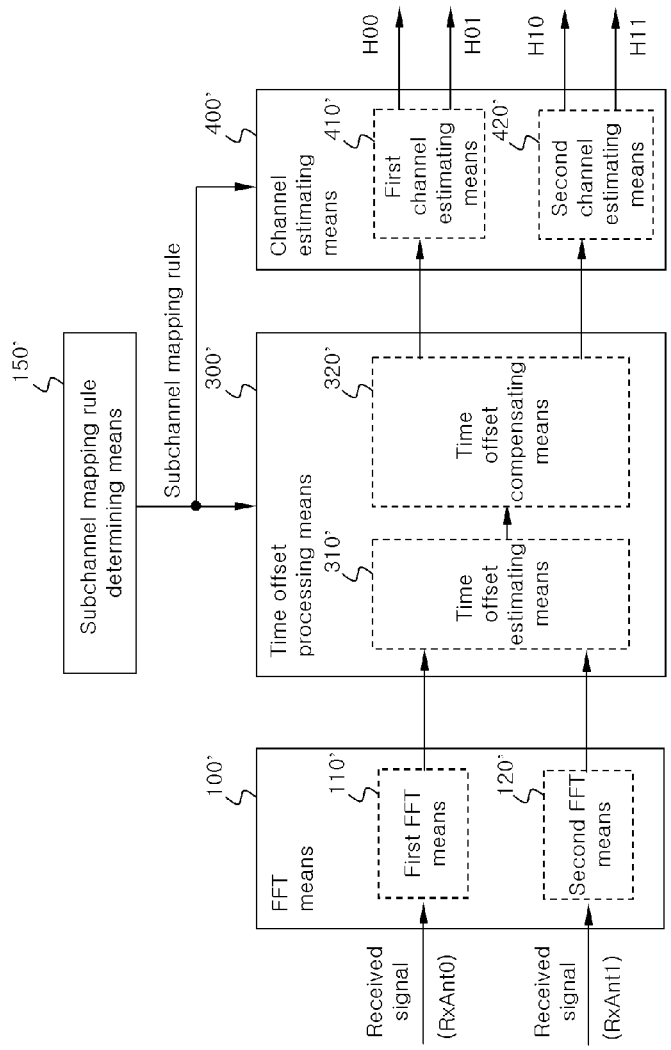
FIG. 21 is a configuration diagram of the channel estimating apparatus according to a second embodiment of the present invention.

As shown in FIG. 21, the channel estimating apparatus to the second embodiment of the present invention includes a FFT (Fast Fourier Transform) means 100', a subchannel mapping rule determining means 150', a time offset processing means 300', and a channel estimating means 400'.

The FFT means 100' converts the signal of time domain, which is received through the first and the second receiving antenna of the base station and transformed into a baseband signal, into a signal of frequency domain.

Here, the FFT means 100' can be comprised of a first FFT means 110' and a second FFT means 120'. In this case, the first FFT means 110' converts the signals of the first channel and the second channel of the time domain received through the first receiving antenna into the signals of the frequency domain. The second FFT means 120' converts the signals of the third channel and the fourth channel of the time domain received through the second receiving antenna into the signals of the frequency domain. Of course, the FFT means 100' can be divided into four parts so as to convert the signal of the time domain received in each channel H00, H01, H10, H11 into the signal of the frequency domain, whereas the signals of time domain can be converted into the signals of the frequency domain in one FFT means.

The subchannel mapping rule determining means 150' determines the subchannel mapping rule for the OFDMA symbol in the uplink PUSC region, thereafter, transmitting to the time offset processing means 300' and/or to the channel estimating means 400'. For example, the subchannel mapping rule determining means 150' determines whether the subchannel rotation with reference to the UL_ZONE_IE (in detail, the Disable subchannel rotation bit: 0=subchannel rotation enable, 1=subchannel rotation disable) included in the UL_MAP of the downlink frame, transmitting the result to the time offset processing means 300' and/or the channel estimating means 400'.

The time offset processing means 300' estimates and compensates the time offset (TO) with a different mode according to the subchannel mapping rule which is transmitted from the subchannel mapping rule determining means 150'. For this, the time offset processing means 300' includes a time offset estimating means 310' estimating the time offset and a time offset compensation means 320' compensating the estimated time offset (refer to FIG. 21).

Hereinafter, referring to FIGS. 22 to 24, the time offset processing means 300' will be explained in detail.

Figure 22:
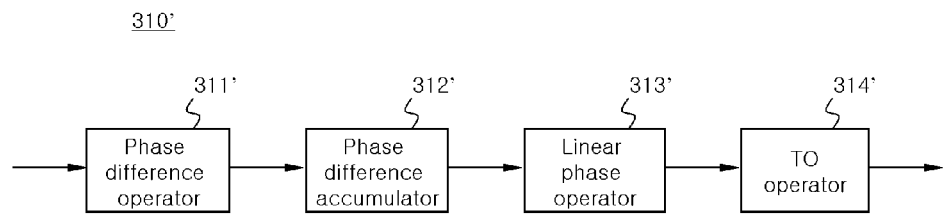
FIG. 22 is a detailed configuration diagram of a time offset estimating means of FIG. 21.

As shown in FIG. 22, the time offset estimating means 310' includes a phase difference operator 311', a phase difference accumulator 312', a linear phase operator 313', and a time offset (TO) operator 314'.

The phase difference operator 311' calculates the phase difference according to the time offset by using two or more pilots included at least one received signal among the received signals of a first signal and a second signal received through a first receiving antenna and the received signals of a third channel and a fourth channel received through a second receiving antenna. The phase difference operator, for example, can be implemented with the form of a multiplier performing the conjugate multiplication for two complex numbers.

The phase difference accumulator 312' accumulates the phase difference according to each time offset calculated in the phase difference operator 311' and generates the phase difference accumulative value. By accumulating the phase difference which is calculated for much more pilots, the phase difference accumulator 312' can estimate the more exact time offset. For reference, the phase difference accumulator can be implemented with the form of an adder.

The linear phase operator 313' converts the phase difference accumulative value accumulated in the second phase difference accumulator 312' into the linear phase according to the time offset. The phase difference accumulation value can be expressed as complex number. Accordingly, as to the phase difference accumulation value with the form in which a real number part is the denominator while an imaginary number part is the numerator, after the arctan operation is performed, the result is divided by the difference of the subcarrier index of pilot used in the phase difference operation, thereby, the linear phase according to the time offset can be obtained. Here, the arctan operation can be performed by using a look-up table in which the input is the ratio of a real number part and an imaginary number part while the output is the calculated value by the arctan operation. Of course, the linear phase can also be obtained by using another well known method. The linear phase for the time offset obtained by such method indicates the average phase difference according to the time offset which is generated between adjacent subcarriers (that is, subcarriers in which the difference of subcarrier index is 1).

The time offset operator 314' converts the linear phase ($\theta_{TO}$) according to the time offset calculated in the linear phase operator 313' into the time offset (TO).

Hereinafter, referring to FIGS. 23 and 24, the time offset estimated method in case of no subchannel rotation will be illustrated.

For reference, in the present embodiment, after the linear phase according to the time offset is obtained by each slot, the average value of linear phase according to the time offset is calculated by averaging the linear phase according to the time offset for the slots corresponding to the same OFDMA slot region. Finally, after calculating the linear phase compensation value according to the time offset of the individual slot region by reflecting the linear phase average value according to the time offset of the adjacent slot region, the time offset by slot region is calculated.

Figure 23:
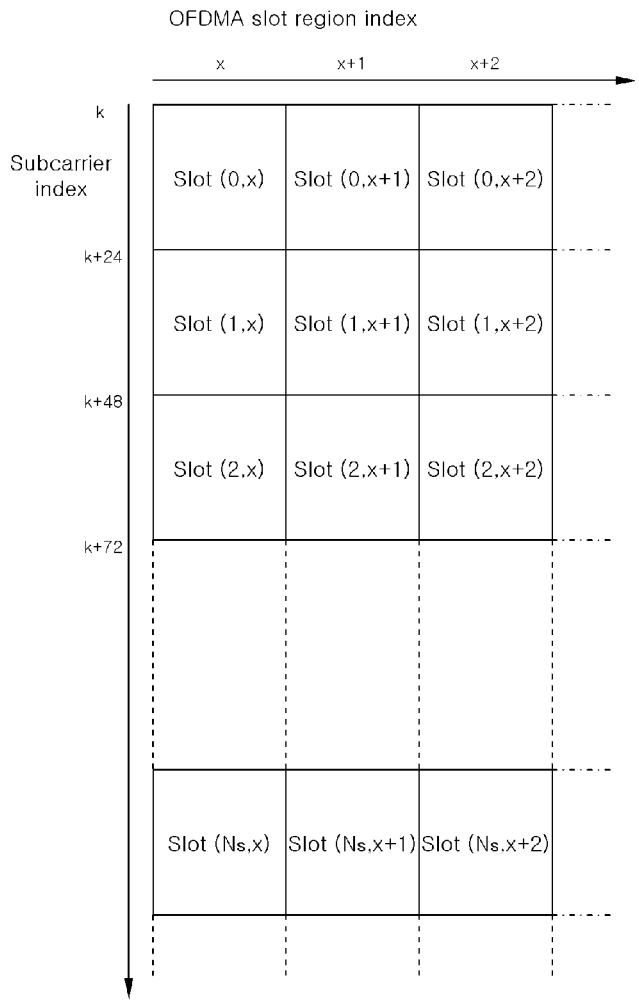
FIG. 23 is a drawing illustrating the case where signals are transmitted through allocating by slot in the uplink PUSC mode.
Figure 24:
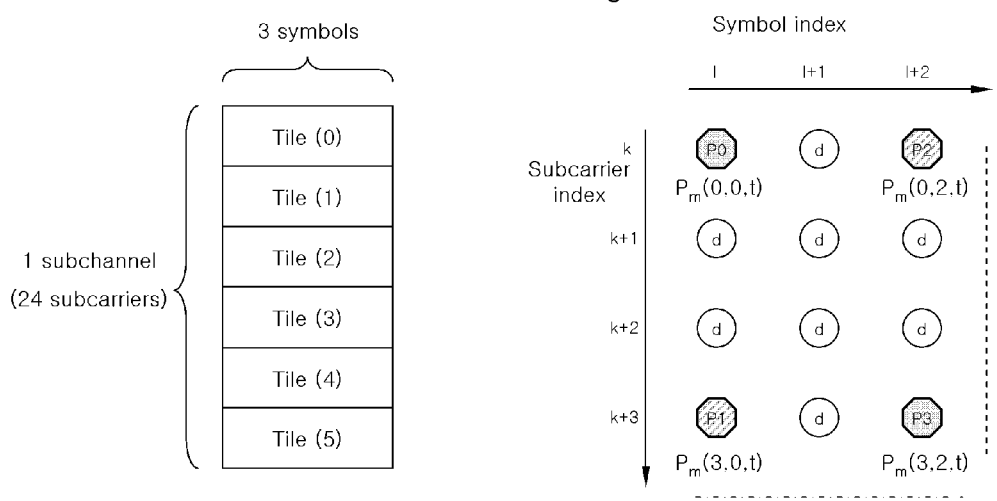
FIG. 24 is a structure diagram of a slot and a tile used in the uplink PUSC mode.

In detail, as shown in FIGS. 23 and 24, the signal (data, pilot) which is transmitted between the terminal and the base station is allocated by slot. In case of the uplink PUSC mode, one slot is formed by 3 OFDMA symbols and one subchannel. The subchannel is comprised of 6 tiles, while one tile includes 4 pilots and 8 data.

In 2×2 collaborative MIMO system, as shown in FIG. 24*b*, in case the first terminal and the second terminal transmit signals with a different pilot pattern, the time offset for the first and the third received signal can be estimated by using a pilot pair of the pilot $P_m(0,0,t)$ having the subcarrier index k and the symbol index l and the pilot $P_m(3,2,t)$ having the subcarrier index k+3 and the symbol index l+2, while the time offset for the second and the fourth received signal can be estimated by using a pilot pair of the pilot $P_m(0,2,t)$ having the subcarrier index k and the symbol index l+2 and the pilot $P_m(3,0,t)$ having the subcarrier index k+3 and the symbol index l.

The following Equation 6 indicates an example of calculating the linear phase according to the time offset for each slot by accumulating the phase difference according to the time offset calculated by each tile. Equation 6-1 indicates the linear phase ($\theta_{TO\_A}$) according to the time offset for the first terminal, and Equation 6-2 indicates the linear phase ($\theta_{TO\_B}$) according to the time offset for the second terminal. For reference, as to the following Equation 2, m indicates a receiving antenna index, t indicates a tile index, and w indicates a weight.

[Equation 6]

$$\theta_{TO\_A} = \frac{1}{3} \cdot \tan^{-1}\left\{ \frac{\text{Im}\left\{\sum_{m=0}^{1}\sum_{t=0}^{5}\left(\frac{P_m(0,0,t) \times P_m^*(3,2,t)}{|P_m(0,0,t) \times P_m^*(3,2,t)|} \times w(m,t)\right)\right\}}{\text{Re}\left\{\sum_{m=0}^{1}\sum_{t=0}^{5}\left(\frac{P_m(0,0,t) \times P_m^*(3,2,t)}{|P_m(0,0,t) \times P_m^*(3,2,t)|} \times w(m,t)\right)\right\}} \right\}$$

(6-1)

$$\theta_{TO\_B} = \frac{1}{3} \cdot \tan^{-1}\left\{ \frac{\text{Im}\left\{\sum_{m=0}^{1}\sum_{t=0}^{5}\left(\frac{P_m(0,2,t) \times P_m^*(3,0,t)}{|P_m(0,2,t) \times P_m^*(3,0,t)|} \times w(m,t)\right)\right\}}{\text{Re}\left\{\sum_{m=0}^{1}\sum_{t=0}^{5}\left(\frac{P_m(0,2,t) \times P_m^*(3,0,t)}{|P_m(0,2,t) \times P_m^*(3,0,t)|} \times w(m,t)\right)\right\}} \right\}$$

(6-2)

In the meantime, the calculated linear phase according to the time offset for the individual slot is averaged by slot region to provide the linear phase average value according to the time offset by slot region.

The following Equation 7 indicates an example of calculating the average value ($\Phi_{TO\_A}$) of the linear phase according to the time offset by slot region for the first terminal. It is obtained by averaging the linear phase according to the time offset for the slots of $N_s+1$ included in one slot region (comprising 3 symbols). For reference, in the following Equation 7, x indicates the OFDMA slot region index (index indicating the region of slot positioned in the direction of OFDMA symbol axis), slot indicates the slot index (refer to FIG. 23).

[Equation 7]

$$\Phi_{TO\_A}(x) = \frac{\sum_{slot=0}^{N_s} \theta_{TO\_A}(slot)}{N_s + 1}$$

In addition, the linear phase average value according to the time offset calculated by each slot region can be compensated by reflecting the linear phase average value according to the time offset of the adjacent slot region. The following Equation 8 indicates an example of calculating the linear phase compensation value ($\tilde{\Phi}_{TO\_A}$) according to the time offset by OFDMA slot region index (that is, by slot region). The Equation 8-1 indicates the case in which x=0, while Equation 8-2, x=1, 2, 3 . . . .

[Equation 8]

$$\tilde{\Phi}_{TO\_A}(x) = \frac{\Phi_{TO\_A}(x) + \Phi_{TO\_A}(x+1)}{2} \quad (8\text{-}1)$$

-continued $$\tilde{\Phi}_{TO\_A}(x) = \frac{\Phi_{TO\_A}(x-1) + \Phi_{TO\_A}(x) + \Phi_{TO\_A}(x+1)}{3} \quad (8\text{-}2)$$

The above Equation 8 can be generalized like the following Equation 9. Similarly, Equation 9-1 indicates the case in which x=0, while Equation 9-2, x=1, 2, 3 . . . . And, w is a weight.

[Equation 9]

$$\tilde{\Phi}_{TOA}(x) = \Phi_{TOA}(x) \times w(x) + \Phi_{TOA}(x+1) \times w(x+1) \quad (9\text{-}1)$$

$$\tilde{\Phi}_{TO\_A}(x) = \Phi_{TO\_A}(x-1) \times w(x-1) + \Phi_{TO\_A}(x) \times w(x) + \Phi_{TO\_A}(x+1) \times w(x+1) \quad (9\text{-}2)$$

Finally, the linear phase compensation value according to the time offset by slot region is converted into the time offset. For example, the time offset (TO) can be calculated by below equation 10 in case of using 1024 FFT like this embodiment.

[Equation 10]

$$TO\_A = \tilde{\Phi}_{TO\_A} \times \frac{1024}{2\pi}$$

In the meantime, in case of subchannel rotation, as described above, the tile or the slot which is adjacent in the direction of the OFDMA symbol axis cannot be used. Accordingly, by using the tile or the slot corresponding to the same slot region, the time offset can be obtained.

For example, in the case of the time offset for the first terminal, a pilot pair of the pilot $P_m(0,0,t)$ having the subcarrier index k and symbol index l and the pilot $P_m(3,2,t)$ having the subcarrier index k+3 and the symbol index l+2 is used, and the time offset can be calculated by the following Equation 11 to the Equation 13. The detailed description for this will be omitted (refer to the above-described Equation 6, 7, 10).

[Equation 11]

$$\theta_{TO\_A} = \frac{1}{3} \cdot \tan^{-1}\left\{ \frac{\text{Im}\left\{\sum_{m=0}^{1}\sum_{t=0}^{5}\left(\frac{P_m(0,0,t) \times P_m^*(3,2,t)}{|P_m(0,0,t) \times P_m^*(3,2,t)|} \times w(m,t)\right)\right\}}{\text{Re}\left\{\sum_{m=0}^{1}\sum_{t=0}^{5}\left(\frac{P_m(0,0,t) \times P_m^*(3,2,t)}{|P_m(0,0,t) \times P_m^*(3,2,t)|} \times w(m,t)\right)\right\}} \right\}$$

[Equation 12]

$$\Phi_{TO\_A}(x) = \frac{\sum_{slot=0}^{N_s} \theta_{TO\_A}(slot)}{N_s + 1}$$

[Equation 13]

$$TO\_A = \Phi_{TO\_A} \times \frac{1024}{2\pi}$$

Referring again to FIG. 21, the channel estimating means 400' estimates the first to the fourth channel with a different method according to the subchannel mapping rule for the first to the fourth received signal in which the time offset is compensated. For reference, in FIG. 21, the channel estimating means 400' is divided into the first channel estimating means 410' estimating the first channel (H00) and the second channel (H01) relating to the first receiving antenna and the second channel estimating means 420' estimating the third channel (H10) and the fourth channel (H11) relating to the second receiving antenna. Of course, the channel estimating means 400' can be implemented to be divided into four parts so as to estimate each channel (H00, H01, H10, H11). On the contrary, it can be implemented to estimate all channels at one channel estimating means.

Figure 25:
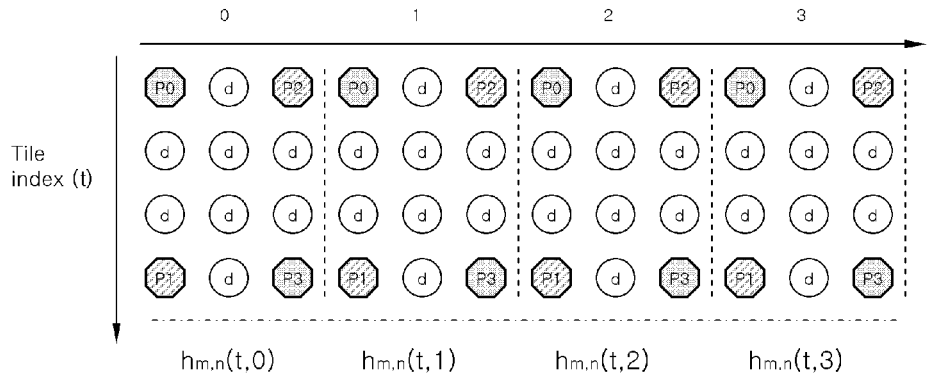
FIG. 25 shows four tiles which are adjacent each other in the direction of the OFDMA symbol axis while having the same tile index.

Hereinafter, referring to FIG. 25, the channel estimating method will be described in detail. For reference, FIG. 25 indicates four tiles which are adjacent in the direction of the OFDMA symbol axis, and it is assumed that the four tiles have a tile index t and have the OFDMA slot region index x=0, 1, 2, 3.

In the meantime, it is defined that the channel estimation value for each tile is $h_{m,n}(t,0)$, $h_{m,n}(t,1)$, $h_{m,n}(t,2)$, $h_{m,n}(t,3)$ respectively. Here m indicates the receiving antenna index, and n indicates the transmitting antenna index.

For example, the channel estimation value by tile for the received signal of the first channel and the third channel transmitted through the first transmitting antenna (TxAnt0) can be calculated like the following Equation 14-1, while the channel estimation value by tile for the received signal of the second channel and the fourth channel transmitted through the second transmitting antenna (TxAnt1) can be calculated like the following Equation 14-2.

[Equation 14]

$$h_{m,0}(t, x) = \frac{1}{2}\{P_m(0, 0, t) + P_m(3, 2, t)\} \quad (14\text{-}1)$$

$$h_{m,1}(t, x) = \frac{1}{2}\{P_m(0, 2, t) + P_m(3, 0, t)\} \quad (14\text{-}1)$$

In the meantime, in case of no subchannel rotation, the channel estimating means 400' calculates the channel compensation value ($\tilde{h}_{m,n}(t,x)$) for the individual tile by reflecting the channel estimation value of the tile which is adjacent in the direction of the OFDMA symbol axis while corresponding to the same subcarrier. It can be calculated like the following Equation 15.

[Equation 15]

$$\tilde{h}_{m,n}(t, 0) = \frac{3}{4}h_{m,n}(t, 0) + \frac{1}{4}h_{m,n}(t, 1) \quad (15\text{-}1)$$

$$\tilde{h}_{m,n}(t, 1) = \frac{1}{4}h_{m,n}(t, 0) + \frac{1}{2}h_{m,n}(t, 1) + \frac{1}{4}h_{m,n}(t, 2) \quad (15\text{-}2)$$

$$\tilde{h}_{m,n}(t, 2) = \frac{1}{4}h_{m,n}(t, 1) + \frac{1}{2}h_{m,n}(t, 2) + \frac{1}{4}h_{m,n}(t, 3) \quad (15\text{-}3)$$

$$\tilde{h}_{m,n}(t, 3) = \frac{1}{4}h_{m,n}(t, 2) + \frac{3}{4}h_{m,n}(t, 3) \quad (15\text{-}4)$$

The above Equation 15 can be generalized like the following Equation 16. Here, Equation 16-1 indicates the case in which x=0, while Equation 16-2 indicates the case in which x=1, 2, 3 . . . . And, w is a weight.

[Equation 16]

$$\tilde{h}_{m,n}(t,x) = h_{m,n}(t,x) \times w(x) + h_{m,n}(t,x+1) \times w(x+1) \quad (16\text{-}1)$$

$$\tilde{h}_{m,n}(t,x) = h_{m,n}(t,x-1) \times w(x-1) + h_{m,n}(t,x) \times w(x) + h_{m,n}(t,x+1) \times w(x+1) \quad (16\text{-}2)$$

In the meantime, in case of the subchannel rotation, as described above, the tile which is adjacent in the direction of the OFDMA symbol axis cannot be used. Accordingly, the channel is estimated by using the pilots included in the individual tile. That is, the channel estimation value ($\tilde{h}_{m,n}(t,x)$) described above cannot be used, but the channel is estimated by calculating the channel compensation value ($h_{m,n}(t,x)$) of each tile.

Figure 26:
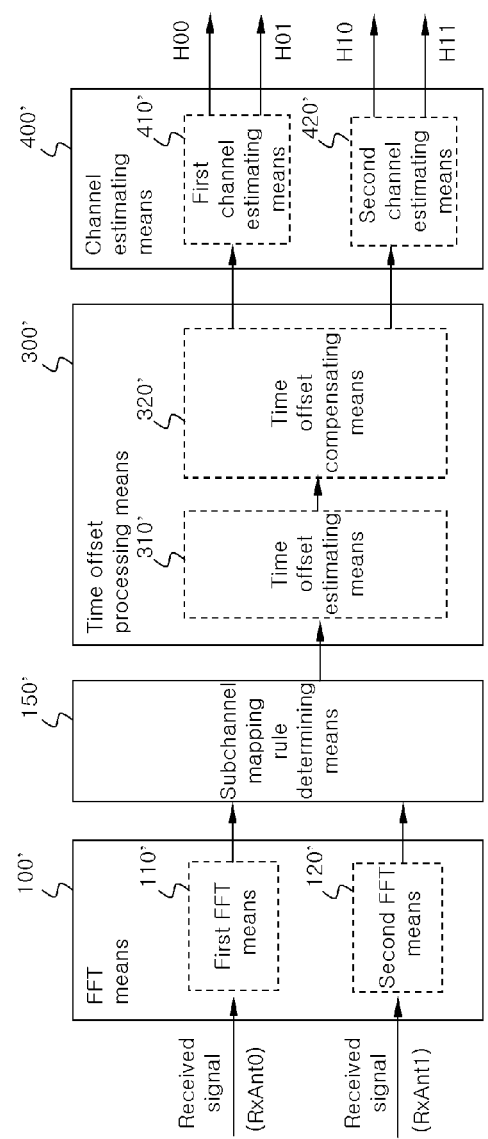
FIG. 26 is a configuration diagram of a channel estimating apparatus according to a third embodiment of the present invention.

So far, the apparatus for channel estimating according to the second embodiment of the present invention was illustrated. Meanwhile, according to a third embodiment of the present invention, as shown in FIG. 26, the subchannel mapping rule determining means 150' is implemented between the FFT 100' means and the time offset processing means 300', so that the subchannel mapping rule may be transmitted to the time offset processing means 300' along with the first to the fourth received signal, after determining the subchannel mapping rule for the first to the fourth received signal.

Hereinafter, referring to FIG. 27, the channel estimating method according to the second embodiment of the present invention will be illustrated. For reference, now that the detailed process or the principles of operation for channel estimating method can refer to the description of the above-described channel estimating apparatus, the overlapped detailed description will be omitted, and the step of time-serially generating will be illustrated.

Figure 27:
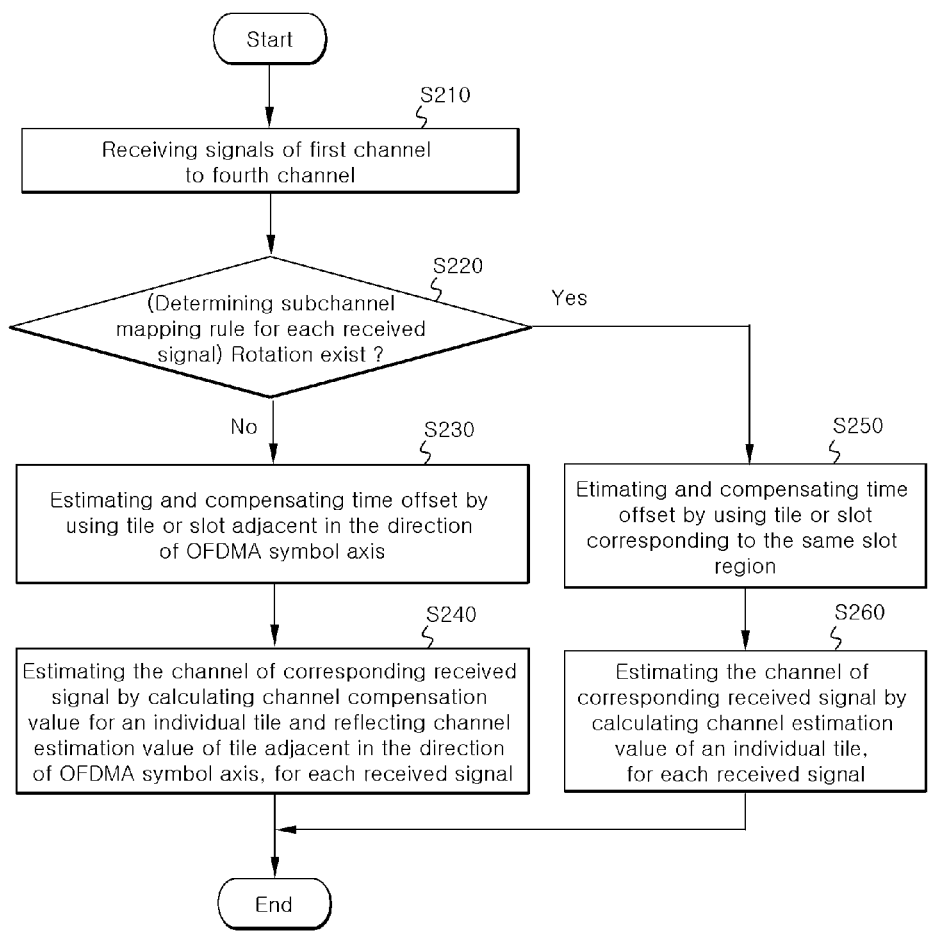
FIG. 27 is a flowchart of the channel estimating method according to a second embodiment of the present invention.

Referring to FIG. 27, firstly, at step S210, the base station receive the received signals of the first channel and the second channel through the first receiving antenna among a plurality of receiving antennas, and receive the received signals of the third channel and the fourth channel through the second receiving antenna. Here, the received signals of the first channel and the third channel are signals transmitted from the first transmitting antenna, while the received signals of the second channel and the fourth channel are signals transmitted from the second transmitting antenna. Further, the first transmitting antenna and the second transmitting antenna can be equipped in a different terminal, while the received signals of the first channel and the third channel and the received signals the second channel and the fourth channel are transmitted with different pilot pattern.

At step S220, the subchannel mapping rule is determined respectively for the received signals of the first channel to the fourth channel. As a result of determination at step S220, in case the subchannel rotation does not exist in the subchannel mapping rule, it proceeds to step S230, so that the channel estimation is performed after the time offset is estimated and compensated by using the tile or slot which is adjacent in the direction of OFDMA symbol axis. On the contrary, in case the subchannel rotation exists in the subchannel mapping rule, it proceeds to step S250, so that the channel estimation is performed after the time offset is estimated and compensated by using the tile or slot corresponding to the same slot region.

In detail, in case that the received signal has no subchannel rotation in the subchannel mapping rule, at step S230, the time offset is estimated and compensated by using the tile or the slot which is adjacent in the direction of the OFDMA symbol axis.

In this case, as described above with reference to the Equation 6 and 7, after obtaining the linear phases for the time offset for slots corresponding to the same OFDMA slot region, and averaging them, the linear phase average value according to the time offset by slot region is calculated.

As described above with reference to the Equation 8 and 9, the linear phase compensation value according to the time offset of the slot region for obtaining is calculated by reflecting the linear phase average value according to the time offset of the adjacent slot region. Thereafter, as described with reference to the Equation 10, the time offset is estimated by converting the calculated linear phase compensation value according to the time offset.

In case the time offset is estimated and compensated at step S230, the channel for each received signal is estimated at step S240. In case the received signal has no subchannel rotation in the subchannel mapping rule, as described above with reference to the Equation 14 to 16, the channel estimation value of the tile for obtaining is calculated by reflecting the channel estimation value of the tile adjacent in the direction of the OFDMA symbol axis so that the channel of a corresponding received signal is estimated.

In the meantime, in case the received signal has subchannel rotation in the subchannel mapping rule, at step S250, the time offset is estimated and compensated by using the tile or the slot corresponding to the same slot region. For this, the description illustrated with reference to Equation 11 to 13 can be referred. In addition, at step S260, the channel of a corresponding received signal can be estimated by calculating the channel estimation value of the individual tile for each received signal.

As described above, the channel estimating method according to an embodiment of the present invention exemplifies a desirable form estimating the time offset and the channel with a different mode according to the subchannel mapping rule. And in case of subchannel rotation in the subchannel mapping rule, it is possible to implement in the form of the combination of the step S230 and the step S260 or the combination of the step S250 and the step S240.

Finally, as to the apparatus and method for estimating time offset according to the present invention, although it just omits the technology estimating a channel in the above described apparatus and method for estimating channel, it estimates the time offset by the substantially same method. Hence, the overlapped description is omitted.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

The invention claimed is:

1. An apparatus for estimating a channel in a MIMO wireless telecommunication system supporting an OFDM or OFDMA, the apparatus comprising:
   FFT means for transforming signals of a first channel and a second channel received through a first receiving antenna and signals of a third channel and a fourth channel received through a second receiving antenna, from a time domain to a frequency domain;
   carrier frequency offset processing means for estimating a carrier frequency offset for a corresponding received signal by using two or more pilots included in at least one received signal among received signals of the first channel to the fourth channel, which are transformed into the frequency domain;
   time offset processing means for estimating a time offset for a corresponding received signal by using two or more pilots included in at least one received signal among received signals of the first channel to the fourth channel, which are transmitted from the carrier frequency offset processing means or the FFT means; and
   channel estimating means for estimating a channel of each received signal of the first channel to the fourth channel with a different method according to a subchannel mapping rule by using pilots included in each received signal, which is transmitted from the time offset processing means.

2. The apparatus of claim 1, further comprising a subchannel mapping rule determining means for determining the subchannel mapping rule and selectively transmitting the received signal of the first channel to the fourth channel, which is outputted from the FFT means, to the carrier frequency offset processing means or the time offset processing means according to the subchannel mapping rule.

3. The apparatus of claim 1, wherein the channel estimating means estimates a channel by using two or more pilots included in two or more tiles corresponding to the same subcarrier respectively, in case a subchannel rotation does not exist in the subchannel mapping rule, while the channel estimating means estimates a channel by using two pilots included in an individual tile, in case a subchannel rotation exists in the subchannel mapping rule.

4. The apparatus of claim 3, wherein the channel estimating means estimates each channel by performing the averaging or the interpolation of pilots included in each received signal which is received through the receiving antenna.

5. The apparatus of claim 4, wherein the channel estimating means interpolates the pilots by using an index difference or a distance difference for the pilots, in case of estimating a channel by interpolating the pilots.

6. The apparatus of claim 1, wherein the carrier frequency offset processing means includes a carrier frequency offset estimating means comprising:
   a first phase difference operator for calculating a phase difference according to a carrier frequency offset for two or more pilots having the same subcarrier index;

a first phase difference accumulator for accumulating a phase difference according to the calculated carrier frequency offset;

a first linear phase operator for calculating a linear phase according to a carrier frequency offset by using a phase difference according to the accumulated carrier frequency offset; and a carrier frequency offset operator for calculating a carrier frequency offset based on the linear phase according to the carrier frequency offset.

7. The apparatus of claim 1, wherein the carrier frequency offset processing means estimates a carrier frequency offset by using a pair of pilots in which the symbol index difference is a multiple of 3 while the pilot pair has the same subcarrier index.

8. The apparatus of claim 1, wherein the carrier frequency offset processing means estimates the carrier frequency offset by using two pairs of pilots having the same subcarrier index difference.

9. The apparatus of claim 1, wherein the time offset processing means includes a time offset estimating means comprising:

a second phase difference operator for calculating a phase difference according to a time offset for two or more pilots;

a second phase difference accumulator for accumulating a phase difference according to the calculated time offset;

a second linear phase operator for calculating a linear phase according to a time offset by using a phase difference according to the accumulated time offset; and a time offset operator for calculating the time offset based on the linear phase according to the time offset.

10. The apparatus of claim 1, wherein the time offset processing means estimates the time offset for the received signal transmitted from the carrier frequency offset processing means, by using a pilot pair in which the carrier frequency offset is compensated while the pilot pair has a different subcarrier index.

11. The apparatus of claim 1, wherein the time offset processing means estimates the time offset for the received signal transmitted from the FFT means, by using two pilots included in an individual tile.

12. The apparatus of claim 1, wherein the received signals of the first and the third channel and the received signals of the second and the fourth channel are transmitted from different terminals.

13. The apparatus of claim 1, wherein the channel estimating apparatus supports at least one among IEEE 802.16d/e, Wibro, and WiMAX standard.

14. A method for estimating a channel in a MIMO wireless telecommunication system supporting an OFDM or OFDMA, the method comprising the steps of:

a) receiving signals of a first channel and a second channel through a first receiving antenna, and signals of a third channel and a fourth channel through a second receiving antenna;

b) determining a subchannel mapping rule for the received signal of the first channel to the fourth channel; and c) estimating the first channel to the fourth channel respectively with a different mode according to the determined subchannel mapping rule, wherein the step c) includes the step of:

c-1) estimating a channel by using two or more pilots included in two or more tiles corresponding to the same subcarrier, for the received signal having no subchannel rotation in the subchannel mapping rule among the received signals of the first channel to the fourth channel.

15. The method of claim 14, after the step b), further comprising the step of:

b') estimating and compensating a carrier frequency offset and a time offset by using two or more pilots included in the received signal having no subchannel rotation in the subchannel mapping rule among the received signals of the first channel to the fourth channel.

16. The method of claim 14, wherein the step c) includes the step of:

c-2) estimating a channel by using two pilots included in an individual tile, for the received signal having the subchannel rotation in the subchannel mapping rule among the received signals of the first channel to the fourth channel.

17. The method of claim 16, after the step b), further comprising the step of:

b') estimating and compensating a time offset by using two or more pilots included in the received signal having the subchannel rotation in the subchannel mapping rule among the received signals of the first channel to the fourth channel.

18. The method of claim 14, wherein, in the step c), the estimating a channel is performed through the averaging or the interpolation of pilots included in the received signal of the first channel to the fourth channel respectively.

19. The method of claim 18, wherein in the step c), the estimating a channel through the interpolation of pilots is performed by using an index difference or a distance difference for the pilots.

20. The method of claim 14, wherein the received signals of the first and the third channel and the received signals of the second and the fourth channel are transmitted from different terminals.

21. The method of claim 14, wherein each different mode comprises a different channel estimation mode.

22. A method for estimating a channel for an uplink PUSC mode in a MIMO wireless telecommunication system supporting an OFDM or OFDMA, the method comprising the steps of:

a) receiving signals transmitted with a spatial multiplexing through the same subcarrier with different pilot patterns from a first terminal and a second terminal, said first terminal and second terminal equipped with one transmitting antenna, through a first receiving antenna and a second receiving antenna, respectively, wherein the signals have no subchannel rotation;

b) estimating a first carrier frequency offset and a first time offset by using two or more pilots included in at least one received signal among the received signals of a first channel and a third channel transmitted from the first terminal, and estimating a second carrier frequency offset and a second time offset by using two or more pilots included in at least one received signal among the received signals of a second channel and a fourth channel transmitted from the second terminal; and c) estimating the first channel and the third channel by using two or more pilots which are included in the received signals of the first channel and the third channel respectively and are compensated for the first carrier frequency offset and the first time offset, and estimating the second channel and the fourth channel by using two or more pilots which are included in the received signals of the second channel and the fourth channel respectively are compensated the second carrier frequency offset and the second time offset.

23. A method for estimating a channel for an uplink PUSC mode in a MIMO wireless telecommunication system supporting an OFDM or OFDMA, the method comprising the steps of:

a) receiving signals transmitted with a spatial multiplexing through the same subcarrier with different pilot patterns from a first terminal and a second terminal, said first terminal and second terminal equipped with one transmitting antenna, through a first receiving antenna and a second receiving antenna, respectively, wherein the signals have the subchannel rotation;

b) estimating a first time offset by using two or more pilots included in at least one received signal among the received signals of a first channel and a third channel transmitted from the first terminal, and estimating a second time offset by using two or more pilots included in at least one received signal among the received signals of a second channel and a fourth channel transmitted from the second terminal; and c) estimating the first channel and the third channel by using two or more pilots which are included in the received signals of the first channel and the third channel respectively and are compensated for the first time offset, and estimating the second channel and the fourth channel by using two or more pilots which are included in the received signals of the second channel and the fourth channel respectively and are compensated for the second time offset.

24. A method for estimating a channel in a MIMO wireless telecommunication system, the method comprising the steps of:

a) receiving signals transmitted with a spatial multiplexing through the same subcarrier with different pilot patterns from a first terminal and a second terminal, said first terminal and second terminal equipped with one transmitting antenna, through a first receiving antenna and a second receiving antenna, respectively, wherein the signals have subchannel mapping rule without subchannel rotation; and b) estimating a channel for each signal by using pilots respectively included in at least two tiles among tiles which correspond to the same subcarrier and are adjacent to each other in the direction of the OFDMA symbol axis.

25. An apparatus for estimating a channel in a MIMO wireless telecommunication system supporting an OFDM or OFDMA, the apparatus comprising:

FFT means for transforming signals of a first channel and a second channel received through a first receiving antenna and signals of a third channel and a fourth channel received through a second receiving antenna, from a time domain to a frequency domain;

subchannel mapping rule determining means for determining a subchannel mapping rule for the received signal of the first channel to the fourth channel;

time offset processing means for estimating a time offset for a corresponding received signal by using a plurality of tiles or slots adjacent in the direction of the OFDMA symbol axis, for a received signal having no subchannel rotation in the subchannel mapping rule among the received signals of the first channel to the fourth channel, which are transformed into the frequency domain; and channel estimating means for estimating a channel of each received signal by using pilots respectively included in the corresponding received signal, for the received signals of the first channel to the fourth channel transmitted from the time offset processing means.

26. The apparatus of claim 25, wherein the channel estimating means estimates a channel by using a channel compensation value of a corresponding tile which is obtained by reflecting a calculated channel estimation value of an adjacent tile into a channel estimation value of the corresponding tile after calculating the channel estimation value of each tile adjacent in the direction of the OFDMA symbol axis, for a signal having no subchannel rotation in the subchannel mapping rule.

27. The apparatus of claim 26, wherein the channel compensation value of the corresponding tile is calculated by multiplying the channel estimation value of the corresponding tile and the channel estimation value of a tile which is adjacent to the corresponding tile in the direction of the OFDMA symbol axis by a weight respectively.

28. The apparatus of claim 25, wherein the channel estimating means estimates a channel by using the channel estimation value of the corresponding tile which is calculated by averaging pilots included in each received signal by the tile, for a signal having the subchannel rotation in the subchannel mapping rule.

29. The apparatus of claim 25, wherein the time offset processing means estimates a time offset by using a linear phase compensation value according to the time offset of a corresponding slot region, which is produced by averaging the linear phase according to the time offset for an individual slot by slot region, calculating the linear phase average value according to the time offset by slot region, and reflecting a linear phase average value according to the time offset of the adjacent slot region into the linear phase average value according to the time offset of the corresponding slot region.

30. The apparatus of claim 29, wherein the linear phase compensation value according to the time offset of the corresponding slot region is calculated by multiplying the linear phase average value according to the time offset of the corresponding slot region and the linear phase average value according to the time offset of the adjacent slot region by a weight respectively.

31. The apparatus of claim 25, wherein the time offset processing means includes a time offset estimating means comprising:

a phase difference operator for calculating a phase difference according to a time offset for two or more pilots included in each tile;

a phase difference accumulator for accumulating a phase difference according to the calculated time offset;

a linear phase operator for calculating a linear phase according to a time offset by slot region by using a phase difference according to the accumulated time offset; and a time offset operator for calculating the time offset based on the linear phase according to the time offset.

32. The apparatus of claim 25, wherein the time offset processing means estimates the time offset by using a tile or a slot corresponding to the same slot region, for a signal having the subchannel rotation in the subchannel mapping rule.

33. The apparatus of claim 25, wherein the received signals of the first and the third channel are transmitted from a first terminal and the received signals of the second and the fourth channel are transmitted from a second terminal.

34. The apparatus of claim 25, wherein the channel estimating apparatus supports at least one of IEEE 802.16d/e, Wibro, and WiMAX standard.

35. An apparatus for estimating a channel in a MIMO wireless telecommunication system supporting an OFDM or OFDMA, the apparatus comprising:

FFT means transforming signals of a first channel and a second channel received through a first receiving antenna and signals of a third channel and a fourth channel received through a second receiving antenna, from a time domain to a frequency domain;

subchannel mapping rule determining means for determining a subchannel mapping rule respectively for the received signals of the first channel to the fourth channel;

time offset processing means for estimating a time offset for a corresponding received signal, by using two or more pilots included in at least one received signal among the received signal of the first channel to the fourth channel, which are transformed into the frequency domain; and channel estimating means estimating a channel of each of the received signal by using a channel compensation value of a corresponding tile which is obtained by calculating the channel estimation value of each tile adjacent in the direction of the OFDMA symbol axis and reflecting a calculated channel estimation value of an adjacent tile into a channel estimation value of the corresponding tile, for a signal having no subchannel rotation in the subchannel mapping rule among the received signals of the first channel to the fourth channel transmitted from the time offset processing means.

36. The apparatus of claim 35, wherein the time offset processing means estimates a time offset by using a linear phase compensation value according to the time offset of a corresponding slot region, which is produced by averaging the linear phase according to the time offset for an individual slot by slot region, calculating the linear phase average value according to the time offset of by slot region, and reflecting a linear phase average value according to the time offset of the adjacent slot region into the linear phase average value according to the time offset of the corresponding slot region.

37. An apparatus for estimating a time offset in a MIMO wireless telecommunication system supporting an OFDM or OFDMA, the apparatus comprising:

FFT means for transforming signals of a first channel and a second channel received through a first receiving antenna and signals of a third channel and a fourth channel received through a second receiving antenna, from a time domain to a frequency domain;

subchannel mapping rule determining means for determining a subchannel mapping rule respectively for the received signals of the first channel to the fourth channel; and time offset processing means for estimating a time offset for a corresponding received signal by using pilots respectively included in a plurality of tiles or slots adjacent in the direction of the OFDMA symbol axis, for a received signal having no subchannel rotation in the subchannel mapping rule among the received signals of the first channel to the fourth channel, which are transformed into the frequency domain.

38. The apparatus of claim 37, wherein the time offset processing means estimates a time offset by using a linear phase compensation value according to the time offset of a corresponding slot region, which is produced by averaging the linear phase according to the time offset for an individual slot by slot region, calculating the linear phase average value according to the time offset by slot region, and reflecting a linear phase average value according to the time offset of the adjacent slot region into the linear phase average value according to the time offset of the corresponding slot region.

39. The apparatus of claim 38, wherein the linear phase compensation value according to the time offset of the corresponding slot region is calculated by multiplying the linear phase average value according to the time offset of the corresponding slot region and the linear phase average value according to the time offset of the adjacent slot region by a weight respectively.

40. The apparatus of claim 37, wherein the time offset processing means includes a time offset estimating means comprising:
a phase difference operator for calculating a phase difference according to a time offset for two or more pilots included in each tile;
a phase difference accumulator for accumulating a phase difference according to the calculated time offset;
a linear phase operator for calculating a linear phase according to a time offset by slot region by using a phase difference according to the accumulated time offset; and
a time offset operator for calculating the time offset based on the linear phase according to the time offset.

41. The apparatus of claim 37, wherein the time offset processing means estimates the time offset by using a tile or a slot corresponding to the same slot region, for a signal having the subchannel rotation in the subchannel mapping rule.

42. The apparatus of claim 37, wherein the received signals of the first and the third channel are transmitted from a first terminal and the received signals of the second and the fourth channel are transmitted from a second terminal.

43. The apparatus of claim 37, wherein the channel estimating apparatus supports at least one of IEEE 802.16d/e, Wibro, and WiMAX standard.

44. A method for estimating a channel for an uplink PUSC mode in a MIMO wireless telecommunication system supporting an OFDM or OFDMA, the method comprising the steps of:

a) receiving signals transmitted with a spatial multiplexing through the same subcarrier with a different pilot patterns from a first terminal and a second terminal, said first terminal and second terminal equipped with one transmitting antenna, through a first receiving antenna and a second receiving antenna, respectively;

b) estimating and compensating a time offset for a corresponding received signal by using a plurality of slots adjacent in the direction of the OFDMA symbol axis, for a signal having no subchannel rotation in a subchannel mapping rule among the received signals; and c) estimating a channel by using pilots respectively included in each received signal, for the received signal in which the time offset is compensated.

45. The method of claim 44, wherein the step b) includes the steps of:

b-1) calculating a linear phase average value according to a time offset by slot region by averaging a linear phase according to the time offset for an individual slot by slot region;

b-2) calculating a linear phase compensation value according to a time offset of a corresponding slot region by reflecting a linear phase average value according to a time offset of an adjacent slot region into a linear phase compensation value according into the time offset of the corresponding slot region; and b-3) estimating a time offset by using the linear phase compensation value of the corresponding slot region.

46. The method of claim 44, wherein the step c) includes the steps of:
   c-1) calculating a channel estimation value of each tile adjacent in the direction of the OFDMA symbols axis;
   c-2) calculating a channel compensation value of a corresponding tile by reflecting the calculated channel estimation value of the adjacent tile into a channel estimation value of the corresponding tile; and
   c-3) estimating a channel of the received signal by using the channel compensation value of the corresponding tile.

47. A method for estimating a channel for an uplink PUSC mode in a MIMO wireless telecommunication system supporting an OFDM or OFDMA, the method comprising the steps of:
   a) receiving signals transmitted with a spatial multiplexing through the same subcarrier with different pilot patterns from a first terminal and a second terminal, said first terminal and second terminal equipped with one transmitting antenna, through a first receiving antenna and a second receiving antenna, respectively;
   b) estimating and compensating a time offset for a corresponding received signal, by using two or more pilots included in at least one received signal among the received signals; and
   c) estimating a channel of the received signal by using the channel compensation value of a corresponding tile, which is produced by calculating the channel estimation value of each tile adjacent in the direction of the OFDMA symbol axis and reflecting the calculated channel estimation value of an adjacent tile into the channel estimation value of the corresponding tile, for a signal having no subchannel rotation in a subchannel mapping rule among the signals in which the time offset is compensated.

48. A method for estimating a time offset for an uplink PUSC mode in a MIMO wireless telecommunication system supporting an OFDM or OFDMA, the method comprising the steps of:
   a) receiving signals transmitted with a spatial multiplexing through the same subcarrier with different pilot patterns from a first terminal and a second terminal, said first terminal and second terminal equipped with one transmitting antenna, through a first receiving antenna and a second receiving antenna, respectively; and
   b) estimating a the time offset for a corresponding received signal by using pilots respectively included in a plurality of slots which are adjacent in the direction of OFDMA symbol axis, for a signal having no subchannel rotation in a subchannel mapping rule among the received signals.

49. The method of claim 48, wherein the step b) includes the steps of:
   b-1) calculating a linear phase average value according to a time offset by slot region by averaging a linear phase according to the time offset for an individual slot by slot region;
   b-2) calculating a linear phase compensation value according to a time offset of a corresponding slot region by reflecting a linear phase average value according to a time offset of an adjacent slot region into a linear phase compensation value according into the time offset of the corresponding slot region; and
   b-3) estimating a time offset by using the linear phase compensation value of the corresponding slot region.

50. A method for estimating a channel in a MIMO wireless communication system supporting an OFDM or OFDMA, the method comprising the steps of:
   a) receiving signals of $M_T$ channels through each of $M_R$ receiving antennas, wherein each of $M_T$ and $M_R$ is integer value higher than 1;
   b) determining a subchannel mapping rule for the received signal of $M_{CH}$ channels wherein the $M_{CH}$ channels are channels formed from $M_T \times M_R$ MIMO system; and
   c) estimating each of the $M_{CH}$ channels with a different mode according to the determined subchannel mapping rule, wherein the different mode comprises a mode in which channel estimation is performed using two or more pilots included in adjacent time/frequency allocated resource units.

51. The method of claim 50, wherein the MIMO wireless communication system is a multi-user MIMO system and the $M_{CH}$ channels are formed by a plurality of terminals and the $M_R$ receiving antennas.

52. The method of claim 50, wherein the subchannel mapping rule has two or more different pilot patterns.

53. The method of claim 50, wherein the different mode comprises a first mode in which channel estimation is performed using two or more pilots included in adjacent time/frequency allocated resource units and a second mode in which channel estimation is performed using two or more pilots includes in each time/frequency allocated resource unit.

* * * * *